United States Patent
Wu et al.

(10) Patent No.: US 12,545,742 B2
(45) Date of Patent: Feb. 10, 2026

(54) HUMANIZED CD37 AND BI-SPECIFIC CD19-HUMANIZED CD37 CAR-T CELLS

(71) Applicants: ProMab Biotechnologies, Inc., Richmond, CA (US); Forevertek Biotechnology Co., Ltd, Changsha (CN)

(72) Inventors: Lijun Wu, Berkeley, CA (US); Vita Golubovskaya, Pinole, CA (US)

(73) Assignees: ProMab Biotechnologies, Inc., Richmond, CA (US); Forevertek Biotechnology Co., Ltd, Changsha (CN)

( * ) Notice: Subject to any disclaimer, the term of this patent is extended or adjusted under 35 U.S.C. 154(b) by 546 days.

(21) Appl. No.: 18/006,651

(22) PCT Filed: Jul. 23, 2021

(86) PCT No.: PCT/US2021/043026
§ 371 (c)(1),
(2) Date: Jan. 24, 2023

(87) PCT Pub. No.: WO2022/026330
PCT Pub. Date: Feb. 3, 2022

(65) Prior Publication Data
US 2023/0279140 A1    Sep. 7, 2023

Related U.S. Application Data

(60) Provisional application No. 63/056,899, filed on Jul. 27, 2020.

(51) Int. Cl.
C07K 16/28 (2006.01)
A61K 40/31 (2025.01)
A61K 40/42 (2025.01)
C12N 5/0783 (2010.01)
A61K 40/11 (2025.01)

(52) U.S. Cl.
CPC .......... *C07K 16/2896* (2013.01); *A61K 40/31* (2025.01); *A61K 40/4211* (2025.01); *A61K 40/4224* (2025.01); *C12N 5/0636* (2013.01); *C12N 5/0646* (2013.01); *A61K 2239/29* (2023.05); *A61K 2239/31* (2023.05); *A61K 2239/48* (2023.05); *C07K 2317/24* (2013.01); *C07K 2317/622* (2013.01)

(58) Field of Classification Search
None
See application file for complete search history.

(56) References Cited

FOREIGN PATENT DOCUMENTS

WO  WO-2020114614 A1 *  6/2020  ............. C07K 16/18
WO  WO-2020260326 A1 * 12/2020  ......... C07K 16/3007

* cited by examiner

*Primary Examiner* — Julie Wu
*Assistant Examiner* — Amy M. Chattin
(74) *Attorney, Agent, or Firm* — Perkins Coie LLP; Viola Kung

(57) ABSTRACT

The present invention is directed to humanized CD37-CAR comprising humanized CD37 scFv of the present invention. The present invention is also directed to a bispecific CD19-humanized CD37 CAR, comprising: (i) CD19 $V_L$, (ii) Humanized CD37 ScFv, (iii) CD19 $V_H$, (iv) a transmembrane domain, (v) at least one co-stimulatory domains, and (vi) an activating domain. The CARs of the present invention are useful in the field of adoptive immunity gene therapy for hematological cancers.

3 Claims, 12 Drawing Sheets
Specification includes a Sequence Listing.

HUMANIZED CD37 AND BI-SPECIFIC CD19-HUMANIZED CD37 CAR-T CELLS

This application is a National Stage of International Application PCT/US2021/043026, filed Jul. 23, 2021, which claims the priority of U.S. Provisional Application No. 63/056,899, filed Jul. 27, 2020. The contents of the above-identified applications are incorporated herein by reference in their entireties.

REFERENCE TO SEQUENCE LISTING, TABLE OR COMPUTER PROGRAM

The Sequence Listing is concurrently submitted herewith with the specification as an ASCII formatted text file via EFS-Web with a file name of SequenceListing.txt with a creation date of Jul. 21, 2021, and a size of 49.5 kilobytes. The Sequence Listing filed via EFS-Web is part of the specification and is hereby incorporated in its entirety by reference herein.

FIELD OF THE INVENTION

The present invention relates to humanized CD37 CAR and bi-specific CD19-humanized CD37-CAR and CAR-T cells, which are useful in the field of adoptive immunity gene therapy for hematological cancers.

BACKGROUND OF THE INVENTION

Immunotherapy is emerging as a highly promising approach for the treatment of cancer. T cells or T lymphocytes, the armed forces of our immune system, constantly look for foreign antigens and discriminate abnormal (cancer or infected cells) from normal cells. Genetically modifying T cells with CAR (Chimeric antigen receptor) constructs is the most common approach to design tumor-specific T cells. CAR-T cells targeting tumor-associated antigens (TAA) can be infused into patients (called adoptive cell transfer or ACT) representing an efficient immunotherapy approach [1, 2]. The advantage of CAR-T technology compared with chemotherapy or antibody is that reprogrammed engineered T cells can proliferate and persist in the patient ("a living drug") [1], [3].

CARs usually consist of a monoclonal antibody-derived single-chain variable fragment (scFv) at the N-terminal part, hinge, transmembrane domain and a number of intracellular co-activation domains: (i) CD28, (ii) CD137 (4-1BB), CD27 or other co-stimulatory domains, in tandem with a activation CD3-zeta domain. (FIG. 1) [1; 2]. The evolution of CARs went from first generation (with no co-stimulation domains) to second generation (with one co-stimulation domain) to third generation CAR (with two co-stimulation domains) and fourth generation (with several co-stimulation domains). Generating CARs with two costimulatory domains (the so-called $3^{rd}$ generation CAR) have led to increased cytolytic CAR-T cell activity, improved persistence of CAR-T cells leading to its augmented antitumor activity.

FIG. 1 show the structures of CAR. The left panel shows the structure of the first generation (no co-stimulation domains). The middle panel shows the structure of the second generation (one co-stimulation domain CD28 or 4-BB). The right panel shows a third generation of CAR (two or several co-stimulation domains). The Figure is from Golubovskaya, Wu, Cancers, 2016 [3].

CD37 is a 40-52 kDa heavily glycosylated member of the transmembrane 4 superfamily (TM4SF) of tetraspanin proteins. CD37 plays a role in integrin, AKT, PI3-Kinase-dependent survival, and apoptotic signaling, motility, immune response signaling via activation of dendritic cell migration.

CD37 is highly expressed in many hematological cancers, such as non-Hodgkin's lymphoma (NHL), diffuse large B-cell lymphoma (DLBCL), chronic lymphocytic leukemia (CLL), acute lymphocytic leukemia (ALL), and in some peripheral and cutaneous T cell lymphomas, and absent or weakly expressed in multiple myeloma and Hodgkin's lymphoma.

CD19 is a known antigen overexpressed in B-cell malignant cancers such as leukemia and lymphoma. CD37 is a member of tetraspanin (or transmembrane 4 superfamily (TM4SF) protein) family proteins, which have four potential membrane-spanning regions, CD37 is also overexpressed in leukemia and lymphoma patients [4].

BRIEF DESCRIPTION OF THE DRAWINGS

FIG. 2A. Humanized CD37-CAR construct. Signal peptide (CD8 alpha leader sequence); humanized CD37 ScFv (VH-linker-VL); CD8 hinge; CD28 transmembrane domain; 41BB costimulatory domain; CD3 activation domain. FIG. 2B. Bispecific CD19-humanized CD37 construct. The second-generation lentiviral CAR under MNDU3 promoter construct are used with 4-1BB co-stimulatory domain. GM-CSFR alpha signaling peptide, CD19 VL; Linker; Humanized CD37ScFv; Linker; CD19 VH, CD8 hinge; CD8 transmembrane domain, 41BB costimulatory and CD3 activation domains. Abbreviations: VL, light chain; L-linker; ScFv-single chain variable fragment; VH, heavy chain; H, hinge; TM, transmembrane domain; hCD37, humanized CD37 ScFv; 41BB co-stimulatory and CD3 activation domains are illustrated for CD19-hCD37 CAR.

FIG. 3A: Humanized CD37-CAR-T cells killed CHO-CD37-positive cells and did not kill CHO cells. Labeling of curves goes from top to bottom; TC-target cells; T cells, Mock CAR-T cells, and hCD37 CAR-T cells. FIG. 3B: Quantification of cytotoxicity shows significantly higher killing by CD37CAR-T cells in CHO-CD37 cells than Mock and T cells. *, hCD37 CAR-T cells with CHO-CD37 cells versus T and Mock CAR-T cells, $p<0.0001$, One-Way ANOVA followed by Dunnett's Multiple Comparison Test. FIG. 3C: hCD37-CAR-T cells secrete significantly higher IFN-gamma with CHO-CD37 cells than with CHO cells. *, $p<0.05$, IFN-gamma of humanized Hum CD37 CAR-T cells with CHO-CD37 cells versus same CAR-T cells with CHO cells by Student's t-test.

FIG. 4A: RTCA activity of hCD37-CD19-CAR-T cells with CHO-CD37 cells (left) and CHO cells (right). Cytotoxicity of bispecific CD37-CD19 CAR-T cells against CHO-CD37 cells was significantly higher than that of humanized CD37 CAR-T cells, *, $p<0.0001$, hCD37 and hCD37-CD19-CAR-T cells with CHO-CD37 cells vs T and Mock CAR-T cells, One-Way ANOVA followed by Sidak's multiple comparison test p=0.0006. FIG. 4B: RTCA activity of hCD37-CD19-CAR-T cells with Hela-CD19 cells (left) and Hela cells (right). Quantification of RTCA at the end time point is shown under the RTCA plots. * p<0.0001, * hCD37-CD19 CAR-T cells and CD19 CAR-T cells with Hela-CD19 cells vs T cells, Mock CAR-T cells, CD37 CAR-T cells by One-Way ANOVA followed by Sidak's multiple comparison as in B. FIG. 4C: IFNgamma secretion by hCD37-CD19-CAR-T cells was significantly higher with CHO-CD37 cells than with CHO cells. *p<0.0001, CD37, hCD37-CD19 CAR-T cells vs other groups with CHO-CD37 cells by One-way ANOVA followed by Tukey's test. FIG. 4D: IFN-gamma secretion by CD37-CAR-T cells was significantly higher with Hela-CD19 cells than with Hela cells, *p<0.05, hCD37-CD19 and CD19 CAR-T cells with Hela-CD19 cells vs other groups with Raji cells, Student's t-test. FIG. 4E: IFN gamma secretion by hCD37-CD19-CAR-T cells against Raji cells was significantly higher than with CD37-negative multiple myeloma MM1S cells, p<0.001, * hCD37, hCD37-CD19 and CD19 CAR-T cells with Raji cells vs Mock CAR-T cell groups with Raji cells by Tukey's test.

FIG. 7A: In vivo imaging of Raji tumors in mice on days 7, 14, and 21 following Raji-Luc+ cells injection with the vehicle, mock-CAR-T cells, or bispecific CD37-CD19 CAR-T cell-treated groups (n=5 each). FIG. 7B: Tumor luminescence flux from In Vivo Imaging System, IVIS imaging. Vehicle-treated mice had died by day 14. * p<0.05, hCD37-CD19 CAR-T cells (bottom curve) vs. Mock CAR-T cells, Student's t-test. FIG. 7C: hCD37-CD19-CAR-T cells significantly prolong mouse survival in the Raji xenograft model. Kaplan-Myer curve is shown, p<0.05, log-rank test hCD37-CD19 CAR-T cell-treated (far-right) vs. Mock CAR-T cell-treated group (middle).

BRIEF DESCRIPTION OF THE INVENTION

Definitions

Figure 1:
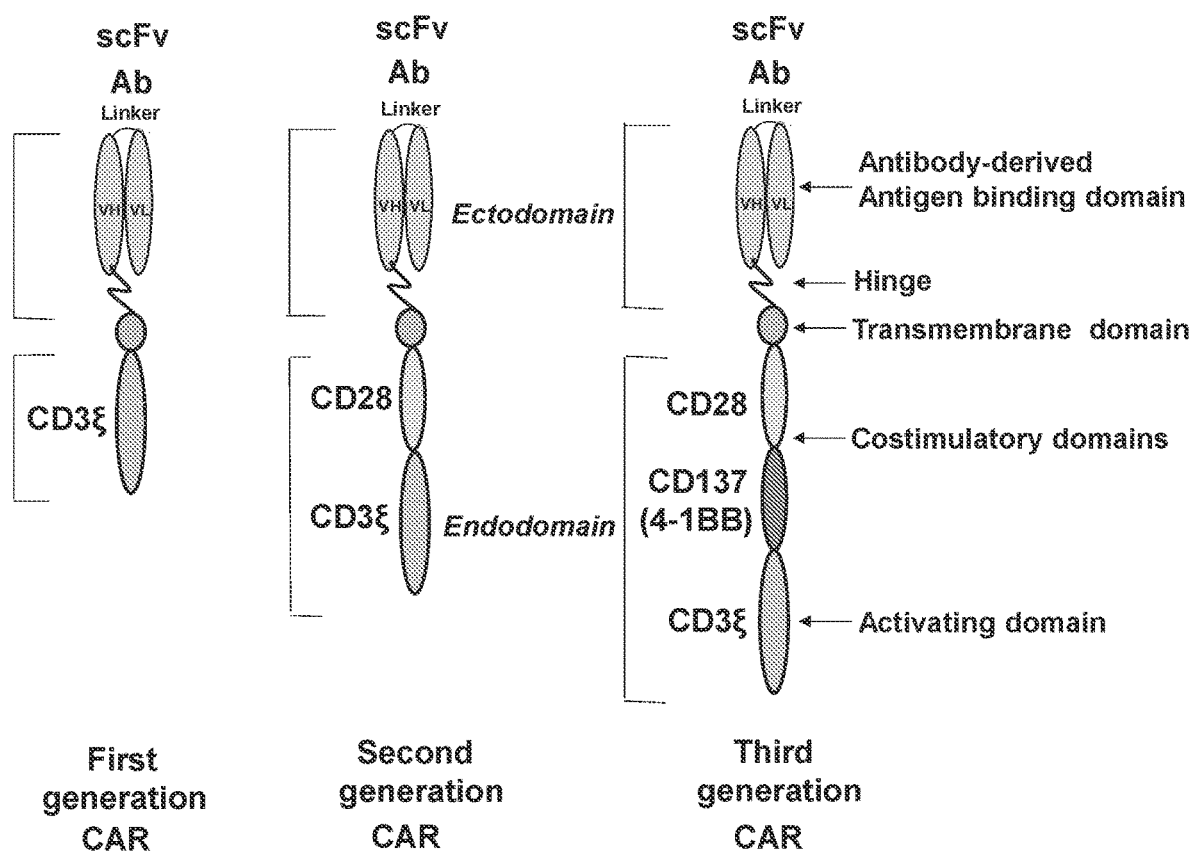
FIG. 1. The structures of CAR.

As used herein, a "chimeric antigen receptor (CAR)" is a receptor protein that has been engineered to give T cells the new ability to target a specific protein. The receptor is chimeric because they combine both antigen-binding and T-cell activating functions into a single receptor. CAR is a fused protein comprising an extracellular domain capable of binding to an antigen, a transmembrane domain, and at least one intracellular domain. The "chimeric antigen receptor (CAR)" is sometimes called a "chimeric receptor", a "T-body", or a "chimeric immune receptor (CIR)." The "extracellular domain capable of binding to an antigen" means any oligopeptide or polypeptide that can bind to a certain antigen. The "intracellular domain" means any oligopeptide or polypeptide known to function as a domain that transmits a signal to cause activation or inhibition of a biological process in a cell.

As used herein, a "domain" means one region in a polypeptide which is folded into a particular structure independently of other regions.

As used herein, "humanized antibodies" are antibodies from non-human species whose protein sequences have been modified to increase their similarity to antibody variants produced naturally in humans.

As used herein, a "single chain variable fragment (scFv)" means a single chain polypeptide derived from an antibody which retains the ability to bind to an antigen. An example of the scFv includes an antibody polypeptide which is formed by a recombinant DNA technique and in which Fv regions of immunoglobulin heavy chain (H chain) and light chain (L chain) fragments are linked via a spacer sequence. Various methods for engineering an scFv are known to a person skilled in the art.

As used herein, a "tumor antigen" means a biological molecule having antigenicity, expression of which causes cancer.

The present invention is directed to a humanized anti-CD37 antibody or an antigen-binding fragment thereof. The present invention is also directed to humanized CD37-CAR T cells that are effective in killing target cells.

The inventors have obtained a mouse monoclonal antibody specifically targeting human CD37 (WO2020/146267) and humanize it to make humanized anti-CD37 antibodies. The inventors then prepared humanized CD37-CAR T cells with the humanized anti-CD37 antibodies and tested them for effectiveness in killing target cells. The inventors tested CAR T cells prepared from 11 humanized anti-CD37 antibodies derived from the above-mentioned mouse monoclonal antibody, and selected two antibodies PMC762 and PMC910, which were the only two humanized antibodies that their CAR T cells were effective in killing target cells.

The advantages of humanized CD37 antibody versus mouse CD37 antibody include that humanized CD37 antibody does not cause immune response against mouse CD37 sequence, and humanized CD37 antibody is better tolerated inside humanized hCD37-CAR-T cells.

The present invention is directed to a humanized anti-human CD37 antibody or an antigen-binding fragment thereof (e.g., Fab, (Fab)$_2$, scFv), comprising (i) VH having the amino acid of SEQ ID NO: 3 and VL having the amino acid of SEQ ID NO: 4, or (ii) VH having the amino acid of SEQ ID NO: 8 and VL having the amino acid of SEQ ID NO: 9. In one embodiment, the antibody or an antigen-binding fragment thereof is a monoclonal antibody. In another embodiment, the antibody or an antigen-binding fragment thereof is a single-chain variable fragment (scFv). The scFv can be VH-linker-VL, or VL-linker-VH.

The present invention is also directed to a chimeric antigen receptor fusion protein CD37-CAR comprising from N-terminus to C-terminus: (i) humanized CD37 ScFv; (ii) a hinge; (iii) a transmembrane (TM) domain; (iv) at least one costimulatory domain; (v) one activation domain.

In another aspect, the present invention is directed to a bispecific CAR. Both CD37 and CD19 proteins play a role in survival signaling. Based on high percent of expression in B-cell lymphoma, both targets can be used for CAR-T cell therapy. Since CD19 expression can be down-regulated or lost in lymphoma patients due to alternatively spliced transcript or other mechanisms leading to patient relapse (2), bi-specific CD19-humanized CD37 can be used in CAR-T cell therapy.

The inventors obtained mouse monoclonal antibodies against human CD19 (FMC63[2]). The inventors then produced bi-specific CD19-humanized CD37 scFv-CAR-T cells to target cancer cells overexpressing CD19 and CD37 tumor antigen. The CD19-hCD37-CAR-T cells of the present invention have high and specific cytotoxic activity against CHO-CD19, CHO-CD37 cells, Hela-CD19, and Hela-CD37 cells.

The advantages of bi-specific CD19/hCD37 CARs include that the bi-specific CAR-T cells target both CD19 and CD37 antigens overexpressed in lymphoma, and therefore they are more effective. If one antigen (CD19 or CD37) is lost or down-regulated, the bi-specific CAR-T cells can still reach the other antigen.

The present invention is directed to a bispecific chimeric antigen receptor (CAR) fusion protein comprising from N-terminus to C-terminus: (i) CD19 VL, (ii) CD37 ScFv, (iii) CD19 VH; (iv) hinge; (v) a transmembrane domain, (vi) at least one co-stimulatory domains, and (vii) an activating domain.

Figure 2A:
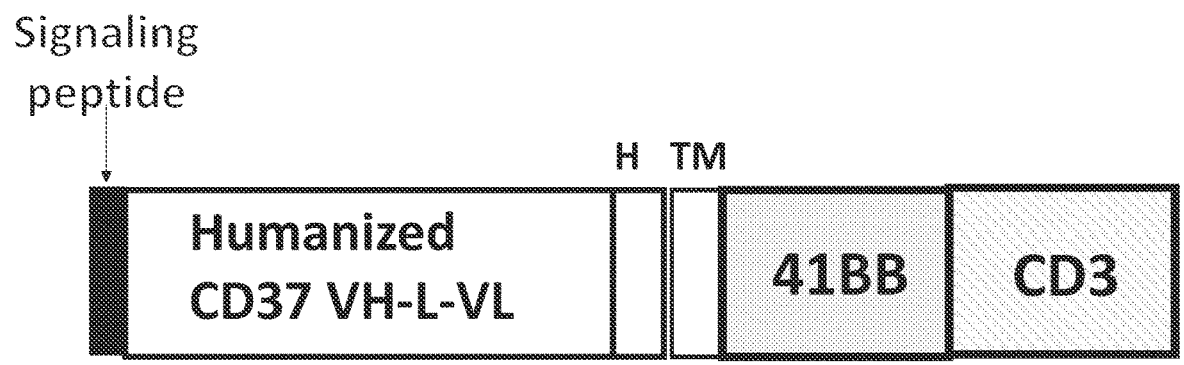
FIGS. 2A and 2B show the structures of humanized CD37-CAR construct and bi-specific CD19-humanized CD37 CAR construct.
Figure 2B:
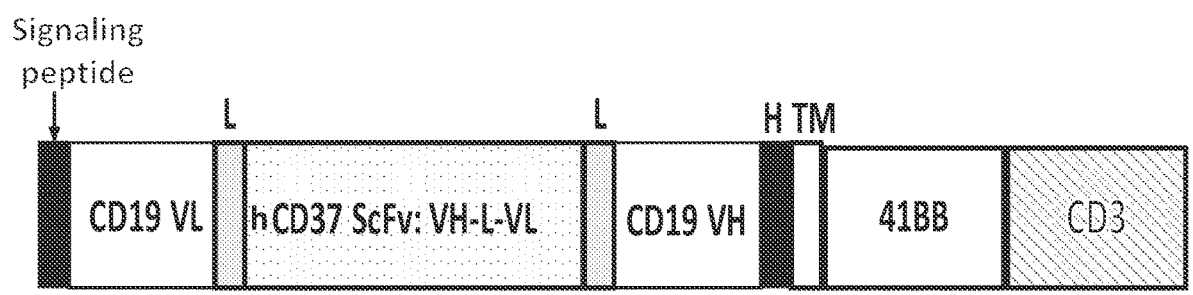

In one embodiment, the humanized CD37-CAR structure is shown in FIG. 2A, and the bispecific CD19-hCD37-CAR is shown in FIG. 2B.

In FIG. 2A, the humanized CD37 scFc in CAR is shown as VH-linker-VL. Alternatively, the humanized CD37 scFc can be VL-linker-VH.

In FIG. 2B, the bispecific CD19-CD37 in CAR is shown as CD19VL-linker-CD37 ScFv-linker-CD19VH. Alternatively, the bispecific CD19-CD37 in CAR can be CD19VH-linker-CD37 ScFv-linker-CD19VL, or CD19ScFv-linker-CD37 ScFv, or CD37 ScFv-linker-CD19ScFv. The VH and VL arrangement in each ScFv can be VH-linker-VL or VL-linker-VH.

The linkers can be the same sequences or different sequences.

In one embodiment, the co-stimulatory domain if CAR is selected from the group consisting of CD28, 4-1BB, GITR, ICOS-1, CD27, OX-40 and DAP10. A preferred the co-stimulatory domain is CD28 or 4-1BB.

A preferred activating domain is CD3 zeta (CD3 Z or CD3ζ).

The transmembrane domain may be derived from a natural polypeptide, or may be artificially designed. The transmembrane domain derived from a natural polypeptide can be obtained from any membrane-binding or transmembrane protein. For example, a transmembrane domain of a T cell receptor α or β chain, a CD3 zeta chain, CD28, CD3ε, CD45, CD4, CD5, CD8, CD9, CD16, CD22, CD33, CD37, CD64, CD80, CD86, CD134, CD137, ICOS, CD154, or a GITR can be used. The artificially designed transmembrane domain is a polypeptide mainly comprising hydrophobic residues such as leucine and valine. It is preferable that a triplet of phenylalanine, tryptophan and valine is found at each end of the synthetic transmembrane domain. Optionally, a short oligopeptide linker or a polypeptide linker, for example, a linker having a length of 2 to 10 amino acids can be arranged between the transmembrane domain and the intracellular domain. In one embodiment, a linker sequence having a glycine-serine continuous sequence can be used.

The present invention provides a nucleic acid encoding the humanized CD37-CAR and the bispecific humanized CD37-CD19 CAR. The nucleic acid encoding the CAR can be prepared from an amino acid sequence of the specified CAR by a conventional method. A base sequence encoding an amino acid sequence can be obtained from the NCBI RefSeq IDs or accession numbers of GenBank for an amino acid sequence of each domain, and the nucleic acid of the present invention can be prepared using a standard molecular biological and/or chemical procedure. For example, based on the base sequence, a nucleic acid can be synthesized, and the nucleic acid of the present invention can be prepared by combining DNA fragments which are obtained from a cDNA library using a polymerase chain reaction (PCR).

A nucleic acid encoding the CAR of the present invention can be inserted into a vector, and the vector can be introduced into a cell. For example, a virus vector such as a retrovirus vector (including an oncoretrovirus vector, a lentivirus vector, and a pseudo type vector), an adenovirus vector, an adeno-associated virus (AAV) vector, a simian virus vector, a vaccinia virus vector or a sendai virus vector, an Epstein-Barr virus (EBV) vector, and a HSV vector can be used. A virus vector lacking the replicating ability so as not to self-replicate in an infected cell is preferably used.

For example, when a retrovirus vector is used, a suitable packaging cell based on a LTR sequence and a packaging signal sequence possessed by the vector can be selected for preparing a retrovirus particle using the packaging cell. Examples of the packaging cell include PG13 (ATCC CRL-10686), PA317 (ATCC CRL-9078), GP+E-86 and GP+envAm-12, and Psi-Crip. A retrovirus particle can also be prepared using a 293 cell or a 293T cell having high transfection efficiency. Many kinds of retrovirus vectors produced based on retroviruses and packaging cells that can be used for packaging of the retrovirus vectors are widely commercially available from many companies.

A CAR-T cell binds to a specific antigen via the CAR, thereby a signal is transmitted into the cell, and as a result, the cell is activated. The activation of the cell expressing the CAR is varied depending on the kind of a host cell and an intracellular domain of the CAR, and can be confirmed based on, for example, release of a cytokine, improvement of a cell proliferation rate, change in a cell surface molecule, or the like as an index. For example, release of a cytotoxic cytokine (IFN-gamma, a tumor necrosis factor, lymphotoxin, etc.) from the activated cell causes destruction of a target cell expressing an antigen. In addition, release of a cytokine or change in a cell surface molecule stimulates other immune cells, for example, a B cell, a dendritic cell, a NK cell, and a macrophage.

Humanized CD37-CAR-T cells can be used as allogenic CAR-T cells.

The cell expressing the CAR can be used as a therapeutic agent for a disease. The therapeutic agent comprises the cell expressing the CAR as an active ingredient, and it may further comprise a suitable excipient.

The inventors have generated hCD37-CAR-T cells and bi-specific CD19-hCD37-ScFv-41BB-CD3-CAR-T against hematological cancer cells overexpressing CD37 lymphoma. CD19-hCD37-CAR-T cells express higher specific cytotoxic activity against CD19-positive and CD37-positive target cancer cells than against non-transduced T cells and Mock-CAR-T cells.

The present humanized CD37 and bi-specific CD19-humanized CD37-CAR-T cells target CHO-CD19 and CHO-CD37 target cells but not CHO cells.

CD19-hCD37-CAR-T cells using the present CD19 and CD37 antibodies can be effectively used to target CD19 and CD37 antigens in CD19- and CD37-positive lymphoma.

CD19-hCD37-CAR-T can be used in combination with different therapies: checkpoint inhibitors; targeted therapies, small molecule inhibitors, and antibodies.

CD19-hCD37-CAR-T cells can be used clinically for targeting CD19- and CD37-positive cells.

Modifications of co-stimulating domains: CD28, 4-1BB and others can be used to increase its efficacy. Tag-conjugated CD19 ScFv or humanized CD37 ScFv can be used for CAR generation.

Third generation CAR-T or other co-activation signaling domains can be used for the same CD19-scFv inside CAR.

Humanized CD19 and humanized CD37 can be used for generation of CD19-CD37-CAR-T cells.

Combination of CD19-hCD37 ScFv-CAR with other CAR targeting other tumor antigens or tumor microenvironment (VEGFR-1-3), PDL-1, CD80 can be used to enhance activity of monotherapy CD19-CD37-CAR.

The present CD19-hCD37-CAR can be used to generate other types of cells such as CAR-natural killer (NK) cells, CD19-hCD37-CAR-macrophages, allogenic CAR-T cells, gene-edited T cells, and other CD19-hCD37-CAR hematopoietic cells, which can target CD19 and CD37-positive cancers. The present invention provides T cells, or NK cells, or macrophages, or hematopoietic cells, or other methods to down-regulate different markers of GVHD (graft versus host disease) and to express the CD37-CAR.

The present invention demonstrates the efficacy of CD37-CAR-T cells and bispecific hCD37-CD19 CAR-T cells in vitro and in vivo. CD37 has been identified as a possible target for NHL immunotherapy. The CD37-CAR-T cell therapy is especially important during lymphoma relapse when CD19 antigen is lost in lymphoma by either alternative splicing or other mechanisms, such as mutations. Thus, CD37-CAR-T cells can improve the outcome of CD19-negative relapsed lymphoma patients. Bi-specific CD37-CD19 CAR-T cells increase the efficacy of CD19-CAR-T cells and are important in case of CD37 antigen loss due to missense mutations or other mechanisms.

The present application shows that humanized CD37-CD19 CAR-T cells effectively blocked lymphoma growth in vivo that can be advantageous in case of downregulation of either CD19 or CD37 pathways or for more efficient targeting of both antigens.

Since lymphoma tumors are heterogeneous and surrounded by a microenvironment that can block immune response functions, the combination therapy of CAR-T cells with checkpoint inhibitors, checkpoint blocking antibodies with agonist antibodies inducing an immune response, or with small molecules can overcome these barriers.

The following examples further illustrate the present invention. These examples are intended merely to be illustrative of the present invention and are not to be construed as being limiting.

EXAMPLES

Materials and Methods

Example 1. Cell Lines, Antibodies, Recombinant Proteins

Raji, RPMI8226, H929, MM1S, K562, CHO, MCF-7, MDA-231, and Lovo cell lines were purchased from the ATCC (Manassas, VA, USA) and cultured either in DMEM (GE Healthcare, Chicago, IL, USA) or in RPMI-1640 medium (ThermoFisher, Waltham, MA, USA) containing 10% FBS (AmCell, Mountain View, CA, USA). CHO-CD37 cells were purchased from BPS Bioscience (San Diego, CA, USA) and cultured in Ham's F12K medium containing 10% Fetal Bovine Serum, FBS and 1 mg/mL geneticin (ThermoFisher). Hela-CD37 were generated by transducing Hela cells with CD37 lentivirus. Human peripheral blood mononuclear cells (PBMC) from whole blood obtained in the Stanford Hospital Blood Center, Stanford, according to IRB-approved protocol (#13942), were isolated by density sedimentation over Ficoll-Paque (GE Healthcare, San Ramon, CA, USA).

Recombinant proteins CD37, CD318, GATA3, CD89, CD43, SP10, MSH2, SERPINA1 were obtained from Promab (Richmond, CA, USA). For ELISA with CD37 and other proteins, HRP labeled anti-Mouse IgG was used from Sigma-Aldrich (St Louis, MO, USA) (Cat #: A0168). Human serum and goat anti-mouse $(Fab)_2$ or anti-human $(Fab)_2$, CD3 antibodies for FACS were from Jackson Immunoresearch (West Grove, PA, USA).

Example 2. Humanization of Mouse Anti-CD37 VH and VL

Humanization of mouse CD37 VH and VL (see WO2020/146267) was performed as described before [5, 6] by grafting mouse complementarity-determining regions (CDRs) with humanized framework sequences [7].

Example 3. CAR Lentivirus $2.5 \times 10^7$ HEK293FT cells (Thermo Fisher) were seeded on 0.01% gelatin-coated 15 cm plates and cultured overnight in DMEM, 2% FBS, 1×pen/strep, and then transfected with the pPACKH1 Lentivector Packaging mix (System Biosciences, Palo Alto, CA, USA) and 10 µg of the lentiviral vector using the NanoFect transfection reagent NF100 (Alstem, Richmond, CA, USA). The next day the medium was replaced with fresh medium, and 48 h later, the lentivirus-containing medium was collected. The medium was cleared of cell debris by centrifugation at 2100×g for 30 min. The virus particles were collected by centrifugation at 112,000×g for 60 min at 4° C. using a SW28.1 rotor, suspended in serum-free DMEM medium, aliquoted, and frozen at −80° C.

Example 4. Peripheral Blood Mononuclear Cell (PBMC) Isolation from Whole Blood

Whole blood (Stanford Hospital Blood Center, Stanford, CA) was collected from individual or mixed donors (depending on the amount of blood required) in 10 mL Heparin vacutainers (Becton Dickinson). Approximately 10 ml of whole anti-coagulated blood was mixed with sterile phosphate buffered saline (PBS) buffer for a total volume of 20 ml in a 50 ml conical centrifuge tube (PBS, pH 7/4, is without Ca2+/Mg2+). The layer of cells containing peripheral blood mononuclear cells (PBMC), seen at the diluted plasma/Ficoll interface was removed very carefully, avoiding any Ficoll, washed twice with PBS, and centrifuged at 200×g for 10 min at room temperature. Cells were counted with a hemocytomter. The PBMC were washed once with CAR-T media (AIM V-AlbuMAX(BSA)(Life Technologies), with 5% AB serum and 1.25 ug/mL amphotericin B (Gemini Bioproducts, Woodland, CA), 100 U/mL penicillin, and 100 ug/mL streptomycin) and used for experiments or were frozen at −80° C.

Example 5. T-Cell Activation from PBMC

The isolated cells (washed with 1×PBS (pH7.4), no $Ca^{2+}/Mg^{2+}$) were washed once in CAR-T media (AIM V-AlbuMAX(BSA)(Life Technologies), with 5% AB serum and 1.25 µg/mL amphotericin B (Gemini Bioproducts, Woodland, CA), 100 U/mL penicillin, and 100 µg/mL streptomycin), in the absence of human interleukin-2 (huIL-2) (Invitrogen), at a concentration of $5 \times 10^5$ cells/mL. The cells were resuspended to a final concentration of $5 \times 10^5$ cells/mL in CAR-T medium with 300 U/mL huIL2. The PBMC were activated at a 1:1 CD3-CD28 bead-to-cell ratio.

Example 6. T-Cell Transduction and Expansion

Following activation of PBMC, cells were incubated for 24 hr at 37° C., 5% $CO_2$. To each well of $1 \times 10^6$ cells add $5 \times 10^6$ lentivirus, and 2 µL/mL of media of Transplus (Alstem, Richmond, CA) (a final dilution of 1:500). Cells were incubated for an additional 24 hours before repeating addition of virus. Cells were then grown in the continued presence of 300 U/ml of IL-2 Fresh medium with IL-2 for a period of 12-14 days (total incubation time is dependent on the final umber of CAR-T cells required). Cell concentrations were analyzed every 2-3 days, with media being added at that time to dilute the cell suspension to $1 \times 10^6$ cells/ml.

Example 7. Flow Cytometry (FACS)

To measure CAR expression, 0.25 million cells were suspended in 100 µL of buffer (PBS (phosphate buffered saline) containing 2 mM EDTA pH 8 and 0.5% BSA) and incubated on ice with 1 µL of human serum for 10 min. Diluted primary antibody biotin-conjugated goat anti-mouse (Fab)$_2$ or anti-human (Fab)$_2$ was used with cells for 30 min at 4° C., and after washing, the secondary antibody was added with APC-conjugated mouse α-human CD3 antibody and PE-conjugated streptavidin at 1:100 dilution for 30 min incubation at 4° C. The cells were rinsed with 3 mL of washing buffer, then stained for 10 min with 7-AAD, suspended in the buffer, and acquired on a FACSCalibur (BD Biosciences, San Jose, CA, USA). Cells were analyzed first for light scatter versus 7-AAD staining, then the 7-AAD-live gated cells were plotted for anti-CD3 staining versus CAR+ staining with anti-(Fab)$_2$ antibodies.

Example 8. Cytotoxicity (RTCA)

Adherent target cells (CHO-CD37; CHO; Hela-CD37 or Hela) were seeded into 96-well E-plates (Acea Biosciences, San Diego, CA, USA) at $1 \times 10^4$ cells per well and monitored in culture overnight with the impedance-based real-time cell analysis (RTCA) xCELLigence system (Acea Biosciences). The next day, the medium was removed and replaced with AIM V-AlbuMAX medium containing 10% FBS±$1 \times 10^5$ effector cells (CAR-T cells or non-transduced T cells) in triplicate. The cells in the E-plates were monitored for another 24-48 h with the RTCA system, and impedance was plotted over time. Cytotoxicity was calculated as (impedance of target cells without effector cells-impedance of target cells with effector cells)×100/impedance of target cells without effector cells.

Example 9. ELISA for Detection IFN-Gamma

Nonadherent target cells (Raji, MMTS, K562) were cultured with the effector cells (CAR-T cells or non-transduced T cells) at a 1:1 ratio ($1 \times 10^4$ cells each) in U-bottom 96-well plates with 200 µL of AIM V-AlbuMAX medium containing 10% FBS, in triplicate. After 16 h, the top 150 µL of the medium was transferred to V-bottom 96-well plates and centrifuged at 300 g for 5 min to pellet any residual cells. The top 120 µL of supernatant was transferred to a new 96-well plate and analyzed by ELISA for human IFN-γ levels using a kit from R&D Systems (Minneapolis, MN, USA) according to the manufacturer's protocol. The supernatant after RTCA with adherent target cells was collected and analyzed as above.

Example 10. Mouse Tumor Xenograft Model and Imaging

Six-week-old male NSG mice (Jackson Laboratories, Bar Harbor, ME, USA) were housed in accordance with the Institutional Animal Care and Use Committee (IACUC) (#LUM-001). Each mouse was injected subcutaneously on day 0 with 100 µL of $5 \times 10^5$ Raji-luciferase positive cells in sterile serum-free medium. The next day $1 \times 10^7$ CAR-T cells in serum-free medium were injected intravenously. Imaging was done using Raji-luciferase positive cells after luciferin injection with Xenogen Ivis System. Quantification was done by measuring photons/sec signals. A Kaplan-Myer survival curve was done based on mice survival data.

Example 11. Statistical Analysis

Data were analyzed and plotted with Prism software (GraphPad V7, San Diego, CA, USA). Comparisons between two groups were performed by unpaired Student's t-test; one or two-way ANOVA, followed by Sidak or Dunnett's tests for multiple comparisons. The p-value <0.05 was considered significant.

Sequences

Example 12. Two Humanized CD37 scFv Sequences

Two sequences of VH and VL and ScFv of humanized CD37 (hCD37) antibody were selected for their high activities in CAR scFv format against CD37-positive cells.

The two sequences of ScFv of humanized CD37 (hCD37) antibody are shown below. The structure of hCD37 scFv is: VH-linker-VL. Linker is G4Sx3. The bold shows the nucleotide sequence; the underlined shows the nucleotide sequence of VL; in between (shown in italics font) is the nucleotide sequence encoding a linker.

```
(a) hCD37 ScFv (#1)
Humanized CD37 ScFv #1, nucleotide sequence (VH bold, linker G4S,
VL underlined):
                                                    (SEQ ID NO: 1)
GAA GTA CAA CTC GTC GAG TCC GGC GGG GGA CTG GTA CAG CCC GGA CGG

TCC CTG AGA CTT AGT TGT ACG GCT TCT GGT TTC ACG TTT TCC GAC

TAT TGG ATG AAT TGG GTG AGG CAA GCG CCC GGT AAA GGC CTG GAA TGG

GTG GGA CAA ATT CGC GAT AAG CCG TAT AAT TAC GAA ACA TTC TAC

AGC GAC TCT GTC AAG GGT AGA TTC ACA ATC TCC CGG GAT GAC AGT AAA
```

-continued

TCC ATT GCA TAC CTC CAG ATG AAC TCT CTC AAA ACC GAG GAT ACA

GCT GTA TAT TAT TGC ACT GGG AGT TTC GCC TAC TGG GGA GCT GGG ACG

ACG GTA ACG GTA TCC TCA GGT GGC GGT GGA AGC GGT GGT GGA GGT

AGT GGA GGG GGT GGG AGT GCC ATT AGG ATG ACT CAG AGC CCC AGT TCT

TTC AGT GCA TCA ACA GGA GAC AGA GTA ACG ATA ACG TGC CGG GCA

AGC GGT AAC ATC CAT AAT TAC CTT GCG TGG TAC CAA CAG AAA CCT GGT

AAA GCG CCG AAA CTT CTC ATT TAC AAT GCT AAG ACC CTT CCC TCC

GGA GTT CCC TCT AGG TTT AGT GGC TCA GGT AGC GGG ACC GAC TTT ACC

TTG ACA ATC AGT TGC CTG CAA TCA GAA GAC TTT GCA ACT TAC TAC

TGC CAA CAG TAT TGG AGC ACC CCC TAT ACG TTT GGC GGC GGT ACT AAA

CTG GAA ATC CGC

Humanized CD37 ScFv #1, amino acid sequence
(SEQ ID NO: 2)
EVQLVESGGGLVQPGRSLRLSCTASGFTFSDYWMNWVRQAPGKGLEWVGQIR

DKPYNYETFYSDSVKGRFTISRDDSKSIAYLQMNSLKTEDTAVYYCTGSFAYWG

AGTTVTVSSGGGGSGGGGSGGGGSAIRMTQSPSSFSASTGDRVTITCRASGNIHNYL

AWYQQKPGKAPKLLIYNAKTLPSGVPSRFSGSGSGTDFTLTISCLQSEDFATYYCQQY

WSTPYTFGGGTKLEIR

Humanized CD37 VH #1, amino acid sequence,
(SEQ ID NO: 3)
EVQLVESGGGLVQPGRSLRLSCTASGFTFSDYWMNWVRQAPGKGLEWVGQIR

DKPYNYETFYSDSVKGRFTISRDDSKSIAYLQMNSLKTEDTAVYYCTGSFAYWG

AGTTVTVSS

Humanized CD37 VL #1 amino acid sequence
(SEQ ID NO: 4)
AIRMTQSPSSFSASTGDRVTITCRASGNIHNYLAWYQQKPGKAPKLLIYNAKTLPSGV

PSRFSGSGSGTDFTLTISCLQSEDFATYYCQQYWSTPYTFGGGTKLEIR

The linker amino sequence is 3xG4S (SEQ ID NO: 5):
G G G G S G G G G S G G G G S (b) hCD37 ScFv (#2)
Humanized CD37 ScFv #2, nucleotide sequence (VH bold, linker G4S
in italics, VL underlined):
(SEQ ID NO: 6)
CAGGTGCAGCTTGTCGAGAGTGGAGGTGGCGTCGTTCAACCTGGTAGAAGT

TTGCGGCTCTCATGTGCGGCCTCTGGATTTACTTTTTCTGACTACTGGATGA

ACTGGGTCAGGCAAGCTCCAGGTAAGGGGCTTGAATGGGTGGCGCAGATCC

GGGATAAGCCATACAACTACGAGACGTTCTACTCAGACAGTGTAAAGGGCA

GATTTACTATAAGTAGAGATAATTCAAAGAACACGCTCTATCTTCAGATGAA

TTCATTGAGAGCGGAGGACACGGCGGTGTACTACTGTACTGGCAGCTTTGC

GTACTGGGGAGCTGGGACAACGGTAACGGTATCTTCT*GGAGGAGGAGGTAGT*

*GGCGGGGGTGGCTCTGGAGGTGGCGGCTCT*GATATACAAATGACTCAAAGTCCAT

CTAGTCTCAGCGCCAGCGTGGGCGACAGGGTCACTATAACGTGTCGAGCGTCTG

GCAATATACACAATTACTTGGCGTGGTATCAGCAAAAACCGGGAAAAGCGCCGA

AGCTGCTCATATATAATGCGAAAACTTTGCCATCAGGCGTTCCTTCCCGGTTCTC

-continued

AGGCTCCGGTTCTGGAACGGACTTTACTCTCACTATCAGTAGCCTTCAGCCAGAG

GACTTCGCCACTTACTATTGCCAGCAATATTGGTCTACTCCTTACACCTTTGGGGG

AGGGACCAAATTGGAAATCCGC

Humanized CD37 ScFv #2, amino acid sequence
(SEQ ID NO: 7)
QVQLVESGGGVVQPGRSLRLSCAASGFTFSDYWMNWVRQAPGKGLEWVAQIRDKPYN

YETFYSDSVKGRFTISRDNSKNTLYLQMNSLRAEDTAVYYCTGSFAYWGAGTTVTVSSG

GGGSGGGGSGGGGSDIQMTQSPSSLSASVGDRVTITCRASGNIHNYLAWYQQKPGKAPKLLI

YNAKTLPSGVPSRFSGSGSGTDFTLTISSLQPEDFATYYCQQYWSTPYTFGGGTKLEIR

Humanized CD37 VH #2, amino acid sequence,
(SEQ ID NO: 8)
QVQLVESGGGVVQPGRSLRLSCAASGFTFSDYWMNWVRQAPGKGLEWVAQIR

DKPYNYETFYSDSVKGRFTISRDNSKNTLYLQMNSLRAEDTAVYYCTGSFAYWG

AGTTVTVSS

Humanized CD37 VL #2 amino acid sequence,
(SEQ ID NO: 9)
DIQMTQSPSSLSASVGDRVTITCRASGNIHNYLAWYQQKPGKAPKLLIYNAKTLPSG

VPSRFSGSGSGTDFTLTISSLQPEDFATYYCQQYWSTPYTFGGGTKLEIR

The linker amino sequence is the same 3×G4S (SEQ ID NO: 5)

Example 13A. Humanized CD37 CAR Sequence #1 (PMC762 CAR or PMC985CAR)

The full length humanized CD37 CAR (PMC762) is shown below: signaling peptide, humanized CD37scFv (VH-linker-VL), Hinge, transmembrane domain, 41BB and CD3 domains.

```
<CD8 alpha signaling peptide +Nhe I site:>
Nucleotide sequence
                                              (SEQ ID NO: 10)
ATGGCCTTACCAGTGACCGCCTTGCTCCTGCCGCTGGCCTTGCTGCTCCACGC CGCCAGGCCGgctagc Amino acid sequence (+NheI site at 3' end for cloning: AS),
                                              (SEQ ID NO: 11)
MALPVTALLLPLALLLHAARPAS <CD37 ScFv, #1>
See Example 12a <Xho site>
Nucleotide sequence
Ctcgag Amino acid sequence
LE <spacer>
Nucleotide sequence
AAGCCC Amino acid sequence
KP
```

-continued

<CD8 alpha hinge>
Nucleotide sequence
(SEQ ID NO: 12)
ACCACGACGCCAGCGCCGCGACCACCAACACCGGCGCCCACCATCGCGTCGCAG

CCCCTGTCCCTGCGCCCAGAGGCGAGCCGGCCAGCGGCGGGGGGCGCAGTGCAC

ACGAGGGGGCTGGACTTCGCCAGTGAT

Amino acid sequence
(SEQ ID NO: 13)
TTTPAPRPPTPAPTIASQPLSLRPEASRPAAGGAVHTRGLDFASD <CD28 Transmembrane domain>
Nucleotide sequence
(SEQ ID NO: 14)
Aagccctttttgggtgctggtggtggttggtggagtcctggcttgctatagcttgctagtaacag tggcctttattatttctgggtg Amino acid sequence,
(SEQ ID NO: 15)
KPFWVLVVVGGVLACYSLLVTVAFIIFWV <41BB>
Nucleotide sequence
(SEQ ID NO: 16)
AAACGGGGCAGAAAGAAACTCCTGTATATATTCAAACAACCATTTATGAGACCAGTACA

AACTACTCAAGAGGAAGATGGCTGTAGCTGCCGATTTCCAGAAGAAGAAGAAGGAGGA

TGTGAACTG

Amino acid sequence
(SEQ ID NO: 17)
KRGRKKLLYIFKQPFMRPVQTTQEEDGCSCRFPEEEEGGCEL

<CD3>
Nucleotide sequence
(SEQ ID NO: 18)
AGAGTGAAGTTCAGCAGGAGCGCAGACGCCCCCGCGTACCAGCAGGGCCAGAAC

CAGCTCTATAACGAGCTCAATCTAGGACGAAGAGAGGAGTACGATGTTTTGGAC

AAGAGACGTGGCCGGGACCCTGAGATGGGGGGAAAGCCGCAGAGAAGGAAGAA

CCCTCAGGAAGGCCTGTACAATGAACTGCAGAAAGATAAGATGGCGGAGGCCTA

CAGTGAGATTGGGATGAAAGGCGAGCGCCGGAGGGGCAAGGGGCACGATGGCC

TTTACCAGGGTCTCAGTACAGCCACCAAGGACACCTACGACGCCCTTCACATGCA

GGCCCTGCCCCCTCGCTAA

Amino acid sequence
(SEQ ID NO: 19)
RVKFSRSADAPAYQQGQNQLYNELNLGRREEYDVLDKRRGRDPEMGGKPQRRKNP

QEGLYNELQKDKMAEAYSEIGMKGERRRGKGHDGLYQGLSTATKDTYDALHMQA

LPPR

< Humanized CD37-CAR, PMC762>
Nucleotide sequence
(SEQ ID NO: 20)
ATGGCCTTACCAGTGACCGCCTTGCTCCTGCCGCTGGCCTTGCTGCTCCACGCCG CCAGGCCGgctagc

GAA GTA CAA CTC GTC GAG TCC GGC GGG GGA CTG GTA CAG CCC GGA CGG

TCC CTG AGA CTT AGT TGT ACG GCT TCT GGT TTC ACG TTT TCC GAC TAT TGG

ATG AAT TGG GTG AGG CAA GCG CCC GGT AAA GGC CTG GAA TGG GTG GGA

CAA ATT CGC GAT AAG CCG TAT AAT TAC GAA ACA TTC TAC AGC GAC TCT

GTC AAG GGT AGA TTC ACA ATC TCC CGG GAT GAC AGT AAA TCC ATT GCA

TAC CTC CAG ATG AAC TCT CTC AAA ACC GAG GAT ACA GCT GTA TAT TAT

```
TGC ACT GGG AGT TTC GCC TAC TGG GGA GCT GGG ACG ACG GTA ACG GTA

TCC TCA GGT GGC GGT GGA AGC GGT GGT GGA GGT AGT GGA GGG GGT GGG

AGT GCC ATT AGG ATG ACT CAG AGC CCC AGT TCT TTC AGT GCA TCA ACA

GGA GAC AGA GTA ACG ATA ACG TGC CGG GCA AGC GGT AAC ATC CAT AAT TAC

CTT GCG TGG TAC CAA CAG AAA CCT GGT AAA GCG CCG AAA CTT CTC ATT

TAC AAT GCT AAG ACC CTT CCC TCC GGA GTT CCC TCT AGG TTT AGT GGC TCA

GGT AGC GGG ACC GAC TTT ACC TTG ACA ATC AGT GCC CTG CAA TCA GAA

GAC TTT GCA ACT TAC TAC TGC CAA CAG TAT TGG AGC ACC CCC TAT ACG

TTT GGC GGC GGT ACT AAA CTG GAA ATC CGC ctcgagAAGCCCACCACGACGCCAGCGCCGCGACCACCAACACCGGCGCCCACCAT

CGCGTCGCAGCCCCTGTCCCTGCGCCCAGAGGCGAGCCGGCCAGCGGCGGGGGG

CGCAGTGCACACGAGGGGGCTGGACTTCGCCAGTGATaagccttttgggtgctggtggtggttgg tggagtcctggcttgctatagcttgctagtaacagtggcctttattattttctgggtgAAACGGGGCA

GAAAGAAACTCCTGTATATATTCAAACAACCATTTATGAGACCAGTACAAACTACTCAAGAGGAAGAT

GGCTGTAGCTGCCGATTTCCAGAAGAAGAAGAAGGAGGATGTGAACTGAGAGTGAAGTTCA

GCAGGAGCGCAGACGCCCCCGCGTACCAGCAGGGCCAGAACCAGCTCTATAACG

AGCTCAATCTAGGACGAAGAGAGGAGTACGATGTTTTGGACAAGAGACGTGGCC

GGGACCCTGAGATGGGGGGAAAGCCGCAGAGAAGGAAGAACCCTCAGGAAGGC

CTGTACAATGAACTGCAGAAAGATAAGATGGCGGAGGCCTACAGTGAGATTGGG

ATGAAAGGCGAGCGCCGGAGGGGCAAGGGGCACGATGGCCTTTACCAGGGTCTC

AGTACAGCCACCAAGGACACCTACGACGCCCTTCACATGCAGGCCCTGCCCCCTC

GCTAA

Amino acid sequence of humanized CD37 CAR
                                                       (SEQ ID NO: 21)
MALPVTALLLPLALLLHAARPASEVQLVESGGGLVQPGRSLRLSCTASGFTFSDY

WMNWVRQAPGKGLEWVGQIRDKPYNYETFYSDSVKGRFTISRDDSKSIAYLQM

NSLKTEDTAVYYCTGSFAYWGAGTTVTVSS_GGGGSGGGGSGGGGS_AIRMTQSPSS

FSASTGDRVTITCRASGNIHNYLAWYQQKPGKAPKLLIYNAKTLPSGVPSRFSGSGSG

TDFTLTISCLQSEDFATYYCQQYWSTPYTFGGGTKLEIRLEKPTTTPAPRPPTPAPTIAS

QPLSLRPEASRPAAGGAVHTRGLDFASDKPFWVLVVVGGVLACYSLLVTVAFIIFWV

KRGRKKLLYIFKQPFMRPVQTTQEEDGCSCRFPEEEEGGCELRVKFSRSADAPAYQQ

GQNQLYNELNLGRREEYDVLDKRRGRDPEMGGKPQRRKNPQEGLYNELQKDKMA

EAYSEIGMKGERRRGKGHDGLYQGLSTATKDTYDALHMQALPPR
```

Example 13B. Humanized CD37 CAR Sequence #2 (PMC910 CAR)

The structure and the sequences of this humanized CD37 CAR sequence #2 (PMC910) are similar to those of Example 13A, except the scFv is hCD37 #2 (see Example 12 (b))

```
The nucleotide sequence of PMC910 CAR is shown below
                                                       (SEQ ID NO: 22)
atggccttaccagtgaccgccttgctcctgccgctggccttgctgctccacgccgccaggccggctagccaggtgcagcttgtcgaga gtggaggtggcgtcgttcaacctggtagaagtttgcggctctcatgtgcggcctctggatttacttttctgactactggatgaactgggtc
```

-continued

```
aggcaagctccaggtaaggggcttgaatgggtggcgcagatccgggataagccatacaactacgagacgttctactcagacagtgta aagggcagatttactataagtagagataattcaaagaacacgctctatcttcagatgaattcattgagagcggaggacacggcggtgta ctactgtactggcagctttgcgtactggggagctgggacaacggtaacggtatcttctggaggaggaggtagtggcgggggtggctct ggaggtggcggctctgatatacaaatgactcaaagtccatctagtctcagcgccagcgtgggcgacagggtcactataacgtgtcgag cgtctggcaatatacacaattacttggcgtggtatcagcaaaaaccgggaaaagcgccgaagctgctcatatataatgcgaaaactttg ccatcaggcgttccttcccggttctcaggctccggttctggaacggactttactctcactatcagtagccttcagccagaggacttcgcca cttactattgccagcaatattggtctactccttaccctttggggggaggaccaaattggaaatccgcctcgagaagcccaccacgacg ccagcgccgcgaccaccaacaccggcgcccaccatcgcgtcgcagcccctgtccctgcgcccagaggcgagccggccagcggc ggggggcgcagtgcacacgaggggctggacttcgccagtgataagccctttgggtgctggtggtggttggtggagtcctggcttg ctatagcttgctagtaacagtggcctttattattttctgggtgaaacggggcagaaagaaactcctgtatatattcaaacaaccatttatgag accagtacaaactactcaagaggaagatggctgtagctgccgatttccagaagaagaagaaggaggatgtgaactgagagtgaagtt cagcaggagcgcagacgcccccgcgtaccagcagggccagaaccagctctataacgagctcaatctaggacgaagagaggagta cgatgttttggacaagagacgtggccgggaccctgagatggggggaaagccgcagagaaggaagaaccctcaggaaggcctcta caatgaactgcagaaagataagatggcggaggcctacagtgagattgggatgaaaggcgagcgccggaggggcaaggggcacg atggcctttaccagggtctcagtacagccaccaaggacacctacgacgcccttcacatgcaggccctgcccctcgctaa
```

The amino acid sequence of PMC910 CAR is shown below (SEQ ID NO: 23)

MALPVTALLLPLALLLHAARPASQVQLVESGGGVVQPGRSLRLSCAASGFTFSDYW
MNWVRQAPGKGLEWVAQIRDKPYNYETFYSDSVKGRFTISRDNSKNTLYLQMNSL
RAEDTAVYYCTGSFAYWGAGTTVTVSSGGGGSGGGGSGGGGSDIQMTQSPSSLSAS
VGDRVTITCRASGNIHNYLAWYQQKPGKAPKLLIYNAKTLPSGVPSRFSGSGSGTDF
TLTISSLQPEDFATYYCQQYWSTPYTFGGGTKLEIRLEKPTTTPAPRPPTPAPTIASQPL
SLRPEASRPAAGGAVHTRGLDFASDKPFWVLVVVGGVLACYSLLVTVAFIIFWVKR
GRKKLLYIFKQPFMRPVQTTQEEDGCSCRFPEEEEGGCELRVKFSRSADAPAYQQGQ
NQLYNELNLGRREEYDVLDKRRGRDPEMGGKPQRRKNPQEGLYNELQKDKMAEA
YSEIGMKGERRRGKGHDGLYQGLSTATKDTYDALHMQALPPR

Example 14A. Bispecific CD19-hCD37 CAR Sequence (PMC 930)

The scheme of bi-specific CD19-humanized CD37-CAR construct is shown on FIG. 2. The scFV is hCD37 antibody #1. Lentiviral vector was used for cloning of CD19-humanized CD37 scFv CAR sequences.

The following nucleotide and amino acid sequences show GM-CSF receptor alpha signaling peptide, CD19 VL-Linker (G4S)-humanized CD37 ScFv (hCD37 VH-Linker-hCD37 VL); G4S linker; CD19 VH; CD8 hinge; CD8 transmembrane; 41BB costimulatory domain; CD3 zeta activation domains (FIG. 2B).

```
<GM-CSF receptor alpha leader>
Nucleotide sequence
```
(SEQ ID NO: 24)

Atgctgctgctcgtgacaagcctgctgctgtgcgagctgccccaccctgcctttctgctgatcccc

Amino acid sequence (SEQ ID NO: 25)

MLLLVTSLLLCELPHPAFLLIP

```
<CD19 VL>
Nucleotide sequence
```
(SEQ ID NO: 26)

gacatccagatgacccagaccaccagcagcctgagcgccagcctgggcgatagagtgaccatcagctgcagagccagccaggac atcagcaagtacctgaactggtatcagcagaaacccgacggcaccgtgaagctgctgatctaccacaccagcagactgcacagcgg -continued cgtgcccagcagattttctggcagcggctccggcaccgactacagcctgaccatctccaacctggaacaggaagatatcgctacgtac ttttgtcagcagggaaacacgcttccatacaccttcggcggcggtacgaagttggagatcacg Amino acid (SEQ ID NO: 27)

DIQMTQTTSSLSASLGDRVTISCRASQDISKYLNWYQQKPDGTVKLLIYHTSRLHSGV

PSRFSGSGSGTDYSLTISNLEQEDIATYFCQQGNTLPYTFGGGTKLEIT

<G4S linker> (SEQ ID NO: 5)

<hCD37 ScFv, #1>=hCD37 VH-linker-hCD37 VL (Same as Example 12A)

<Linker G4S> (SEQ ID NO: 5)

<CD19 VH>
Nucleotide Sequence (SEQ ID NO: 28)

GAGGTC AAA CTG CAG GAA TCC GGA CCA GGG CTT GTA GCC CCC TCA CAA

AGC CTC AGC GTG ACT TGT ACA GTGACG GGC GTT AGT CTG CCG GAC TAT

GGA GTT TCT TGG ATT CGG CAA CCG CCC AGA AAA GGG CTG GAA TGGCTT

GGT GTT ATA TGG GGC TCA GAA ACT ACC TAT TAC AAC AGT GCT CTC

AAA AGC CGG CTC ACA ATA ATAAAG GAT AAT AGC AAA TCT CAA GTT TTC

CTG AAA ATG AAC TCT CTG CAA ACA GAT GAC ACG GCG ATC TACTAC TGC

GCG AAA CAC TAC TAT TAC GGC GGC AGC TAC GCC ATG GAC TAT TGG

GGG CAG GGG ACG TCA GTG ACA GTG TCT AGC

Amino acid sequence (SEQ ID NO: 29)

EVKLQESGPGLVAPSQSLSVTCTVSGVSLPDYGVSWIRQPPRKGLEWLGVIWGSETTYYNS

ALKSRLTIIKDNSKSQVFLKMNSLQTDDTAIYYCAKHYYYGGSYAMDYWGQGTSVTVSS

<two amino-acids spacer>
Nucleotide sequence
AGC GGG

Amino acid sequence
SG

<CD8 hinge>
Nucleotide sequence (SEQ ID NO: 30)
accacgacgcccgcccctagaccccgacgcccgctccgactatagcgagccaacctctcagcctgaggcctgaagcatgtcgacc agcagcaggaggggcagtacacaccagggcctggattttgcctgtgat Amino acid sequence (SEQ ID NO: 31)

TTTPAPRPPTPAPTIASQPLSLRPEACRPAAGGAVHTRGLDFACD

<CD8 transmembrane domain>
Nucleotide sequence (SEQ ID NO: 32)
Atctacatctgggcgcccttggccgggacttgtggggtccttctcctgtcactggttatcacccttactgc Amino acid sequence (SEQ ID NO: 33)

IYIWAPLAGTCGVLLLSLVITLYC

<41BB costimulatory domain>
See Example 13A

<CD3 zeta>
See Example 13A

The full length CD19-humanized-CD37 CAR (PMC930) is shown below: GM-CSF receptor alpha signaling peptide underlined; CD19 VL in bold; G4S linker italics underlined; humanized CD37 ScFv (VH-linker-VL); linker G4S underlined italics; CD19 VH bold, italics; SG amino-acids; then CD8 alpha hinge, in bold, underlined; CD8 alpha 15 transmembrane domain regular font, underlined; then 4-1BB domain in bold; CD3 activation domain, regular font.

The nucleotide sequence of bispecific CD19-humanized CD37-CAR (PMC930 CAR) is shown below (SEQ ID NO: 34).

<u>atgctgctgctcgtgacaagcctgctgctgtgcgagctgccccaccctgcctttctgctgat</u>
<u>cccc</u> gacatccagatgacccagaccaccagcagcctgagcgccagcctgggcgatagagtgaccat cagctgcagagccagccaggacatcagcaagtacctgaactggtatcagcagaaacccgacg gcaccgtgaagctgctgatctaccacaccagcagactgcacagcggcgtgcccagcagattt tctggcagcggctccggcaccgactacagcctgaccatctccaacctggaacaggaagatat cgctacgtacttttgtcagcagggaaaacacgcttccatacaccttcggcggcggtacgaagt tggagatcacg*GGC GGA GGA GGG AGT* GAA GTA CAA CTC GTC GAG TCC GGC

GGG GGA CTG GTA CAG CCC GGA CGG TCC CTG AGA CTT AGT TGT ACG

GCT TCT GGT TTC ACG TTT TCC GAC TAT TGG ATG AAT TGG GTG AGG

CAA GCG CCC GGT AAA GGC CTG GAA TGG GTG GGA CAA ATT CGC GAT

AAG CCG TAT AAT TAC GAA ACA TTC TAC AGC GAC TCT GTC AAG GGT

AGA TTC ACA ATC TCC CGG GAT GAC AGT AAA TCC ATT GCA TAC CTC

CAG ATG AAC TCT CTC AAA ACC GAG GAT ACA GCT GTA TAT TAT TGC

ACT GGG AGT TTC GCC TAC TGG GGA GCT GGG ACG ACG GTA ACG GTA

TCC TCA GGT GGC GGT GGA AGC GGT GGT GGA GGT AGT GGA GGG GGT

GGG AGT GCC ATT AGG ATG ACT CAG AGC CCC AGT TCT TTC AGT GCA

TCA ACA GGA GAC AGA GTA ACG ATA ACG TGC CGG GCA AGC GGT AAC

ATC CAT AAT TAC CTT GCG TGG TAC CAA CAG AAA CCT GGT AAA GCG

CCG AAA CTT CTC ATT TAC AAT GCT AAG ACC CTT CCC TCC GGA GTT

CCC TCT AGG TTT AGT GGC TCA GGT AGC GGG ACC GAC TTT ACC TTG

ACA ATC AGT TGC CTG CAA TCA GAA GAC TTT GCA ACT TAC TAC TGC

CAA CAG TAT TGG AGC ACC CCC TAT ACG TTT GGC GGC GGT ACT AAA

CTG GAA ATC CGC *GGT GGT GGA GGG AGC* GAGGTC AAA CTG CAG GAA TCC

GGA CCA GGG CTT GTA GCC CCC TCA CAA AGC CTC AGC GTG ACT TGT

ACA GTGAGC GGC GTT AGT CTG CCG GAC TAT GGA GTT TCT TGG ATT CGG

CAA CCG CCC AGA AAA GGG CTG GAA TGGCTT GGT GTT ATA TGG GGC TCA

GAA ACT ACC TAT TAC AAC AGT GCT CTC AAA AGC CGG CTC ACA ATA

ATAAAG GAT AAT AGC AAA TCT CAA GTT TTC CTG AAA ATG AAC TCT CTG

CAA ACA GAT GAC ACG GCG ATC TACTAC TGC GCG AAA CAC TAC TAT TAC

GGC GGC AGC TAC GCC ATG GAC TAT TGG GGG CAG GGG ACG TCA GTG

ACA GTG TCT AGC AGC GGG <u>ACC ACG ACG CCC GCC CCT AGA CCC CCG</u>

<u>ACG CCC GCT CCG ACT ATA GCG AGCCAA CCT CTC AGC CTG AGG CCT GAA</u>

<u>GCA TGT CGA CCA GCA GCA GGA GGG GCA GTA CAC ACC AGG GGC CTGGAT</u>

<u>TTT GCC TGT</u>

<u>GAT</u>atctacatctgggcgcccttggccgggacttgtggggtccttctcctgtcactggttat cacccctttactgcaaacggggcagaaagaaactcctgtatatattcaaacaaccatttatga

```
gaccagtacaaactactcaagaggaagatggctgtagctgccgatttccagaagaagaagaa ggaggatgtgaactgagagtgaagttcagcaggagcgcagacgccccgcgtacaagcaggg ccagaaccagctctataacgagctcaatctaggacgaagagaggagtacgatgttttggaca agagacgtggccgggaccctgagatgggggggaaagccgagaaggaagaaccctcaggaaggc ctgtacaatgaactgcagaaagataagatggcggaggcctacagtgagattgggatgaaagg cgagcgccgaggggcaaggggcacgatggcctttaccagggtctcagtacagccaccaagg acacctacgacgcccttcacatgcaggccctgccccctcgctaa
```

The amino acid sequence of bispecific CD19-humanized CD37-CAR (PMC930) is shown below.

(SEQ ID NO: 35)

```
MLLLVTSLLLCELPHPAFLLIPDIQMTQTTSSLSASLGDRVTISCRASQDISKYLNWYQ

QKPDGTVKLLIYHTSRLHSGVPSRFSGSGSGTDYSLTISNLEQEDIATYFCQQGNTLPY

TFGGGTKLEITGGGGSEVQLVESGGGLVQPGRSLRLSCTASGFTFSDYWMNWVRQA

PGKGLEWVGQIRDKPYNYETFYSDSVKGRFTISRDDSKSIAYLQMNSLKTEDTAVYY

CTGSFAYWGAGTTVTVSSGGGGSGGGGSGGGGSAIRMTQSPSSFSASTGDRVTITCR

ASGNIHNYLAWYQQKPGKAPKLLIYNAKTLPSGVPSRFSGSGSGTDFTLTISCLQSED

FATYYCQQYWSTPYTFGGGTKLEIRGGGGSEVKLQESGPGLVAPSQSLSVTCTVSGV

SLPDYGVSWIRQPPRKGLEWLGVIWGSETTYYNSALKSRLTIIKDNSKSQVFLKMNS

LQTDDTAIYYCAKHYYYGGSYAMDYWGQGTSVTVSSSGTTTPAPRPPTPAPTIASQP

LSLRPEACRPAAGGAVHTRGLDFACDIYIWAPLAGTCGVLLLSLVITLYCKRGRKKL

LYIFKQPFMRPVQTTQEEDGCSCRFPEEEEGGCELRVKFSRSADAPAYKQGQNQLYN

ELNLGRREEYDVLDKRRGRDPEMGGKPRRKNPQEGLYNELQKDKMAEAYSEIGMK

GERRRGKGHDGLYQGLSTATKDTYDALHMQALPPR
```

Example 14B. Bispecific CD19-hCD37 CAR Sequence (PMC 1046)

The structure and the sequences of this bispecific CD19-hCD37 CAR sequence #2 (PMC1046) are similar to those of Example 13A, except the scFv of hCD37 (#2) is used in the CAR.

Nucleotide sequence of PMC1046

(SEQ ID NO: 36)

```
atgctgctgctcgtgacaagcctgctgctgtgcgagctgccccaccctgcctttctgctgatccccgacatcca gatgacccagaccaccagcagcctgagcgccagcctgggcgatagagtgaccatcagctgcagagccagccaggacatcagcaa gtacctgaactggtatcagcagaaacccgacggcaccgtgaagctgctgatctaccacaccagcagactgcacagcggcgtgccca gcagattttctggcagcggctccggcaccgactacagcctgaccatctccaacctggaacaggaagatatc GCT ACG TAC

TTT TGT CAG CAG GGA AAC ACG CTT CCA TAC ACC TTC GGC GGC GGT ACG

AAG TTG GAG ATCACG GGC GGA GGA GGG AGT

CAGGTGCAGCTTGTCGAGAGTGGAGGTGGCGTCGTTCAACCTGGTAGAAGTTTGC

GGCTCTCATGTGCGGCCTCTGGATTTACTTTTTCTGACTACTGGATGAACTGGGTC

AGGCAAGCTCCAGGTAAGGGGCTTGAATGGGTGGCGCAGATCCGGGATAAGCCA

TACAACTACGAGACGTTCTACTCAGACAGTGTAAAGGGCAGATTTACTATAAGTA

GAGATAATTCAAAGAACACGCTCTATCTTCAGATGAATTCATTGAGAGCGGAGG

ACACGGCGGTGTACTACTGTACTGGCAGCTTTGCGTACTGGGGAGCTGGGACAA
```

-continued

```
CGGTAACGGTATCTTCTGGAGGAGGAGGTAGTGGCGGGGGTGGCTCTGGAGGTG

GCGGCTCTGATATACAAATGACTCAAAGTCCATCTAGTCTCAGCGCCAGCGTGGG

CGACAGGGTCACTATAACGTGTCGAGCGTCTGGCAATATACACAATTACTTGGCG

TGGTATCAGCAAAAACCGGGAAAAGCGCCGAAGCTGCTCATATATAATGCGAAA

ACTTTGCCATCAGGCGTTCCTTCCCGGTTCTCAGGCTCCGGTTCTGGAACGGACTT

TACTCTCACTATCAGTAGCCTTCAGCCAGAGGACTTCGCCACTTACTATTGCCAG

CAATATTGGTCTACTCCTTACACCTTTGGGGGAGGGACCAAATTGGAAATCCGC

GGT GGT GGA GGG AGC GAGGTC AAA CTG CAG GAA TCC GGA CCA GGG CTT

GTA GCC CCC TCA CAA AGC CTC AGC GTG ACT TGT ACA GTGAGC GGC GTT

AGT CTG CCG GAC TAT GGA GTT TCT TGG ATT CGG CAA CCG CCC AGA AAA

GGG CTG GAA TGGCTT GGT GTT ATA TGG GGC TCA GAA ACT ACC TAT TAC

AAC AGT GCT CTC AAA AGC CGG CTC ACA ATA ATAAAG GAT AAT AGC AAA

TCT CAA GTT TTC CTG AAA ATG AAC TCT CTG CAA ACA GAT GAC ACG GCG

ATC TACTAC TGC GCG AAA CAC TAC TAT TAC GGC GGC AGC TAC GCC ATG

GAC TAT TGG GGG CAG GGG ACG TCA GTGACA GTG TCT AGC AGC GGG ACC

ACG ACG CCC GCC CCT AGA CCC CCG ACG CCC GCT CCG ACT ATA GCG

AGCCAA CCT CTC AGC CTG AGG CCT GAA GCA TGT CGA CCA GCA GCA GGA

GGG GCA GTA CAC ACC AGG GGC CTGGAT TTT GCC

TGTgatatctacatctgggcgcccttggccgggacttgtggggtccttctcctgt cactggttatcacccttactgcaaacggggcagaaagaaactcctgtatatattcaaacaaccatttatgagaccagtacaaactac tcaagaggaagatggctgtagctgccgatttccagaagaagaagaaggaggatgtgaactgagagtgaagttcagcaggagcgc agacgcccccgcgtacaagcagggccagaaccagctctataacgagctcaatctaggacgaagagaggagtacgatgttttggac aagagacgtggccgggaccctgagatgggggaaagccgagaaggaagaaccctcaggaaggcctgtacaatgaactgcagaa agataagatggcggaggcctacagtgagattgggatgaaaggcgagcgccggaggggcaaggggcacgatggcctttaccaggg tctcagtacagccaccaaggacacctacgacgcccttcacatgcaggccctgccccctcgctaa
```

Amino acid sequence of PMC1046                                           (SEQ ID NO: 37)

MLLLVTSLLLCELPHPAFLLIPDIQMTQTTSSLSASLGDRVTISCRASQDISKYLNWYQ

QKPDGTVKLLIYHTSRLHSGVPSRFSGSGSGTDYSLTISNLEQEDIATYFCQQGNTLPY

TFGGGTKLEITGGGGSQVQLVESGGGVVQPGRSLRLSCAASGFTFSDYWMNWVRQ

APGKGLEWVAQIRDKPYNYETFYSDSVKGRFTISRDNSKNTLYLQMNSLRAEDTAV

YYCTGSFAYWGAGTTVTVSSGGGGSGGGGSGGGGSDIQMTQSPSSLSASVGDRVTIT

CRASGNIHNYLAWYQQKPGKAPKLLIYNAKTLPSGVPSRFSGSGSGTDFTLTISSLQP

EDFATYYCQQYWSTPYTFGGGTKLEIRGGGGSEVKLQESGPGLVAPSQSLSVTCTVS

GVSLPDYGVSWIRQPPRKGLEWLGVIWGSETTYYNSALKSRLTIIKDNSKSQVFLKM

NSLQTDDTAIYYCAKHYYYGGSYAMDYWGQGTSVTVSSSGTTTPAPRPPTPAPTIAS

QPLSLRPEACRPAAGGAVHTRGLDFACDIYIWAPLAGTCGVLLLSLVITLYCKRGRK

KLLYIFKQPFMRPVQTTQEEDGCSCRFPEEEEGGCELRVKFSRSADAPAYKQGQNQL

YNELNLGRREEYDVLDKRRGRDPEMGGKPRRKNPQEGLYNELQKDKMAEAYSEIG

MKGERRRGKGHDGLYQGLSTATKDTYDALHMQALPPR

Results

Figure 3A:
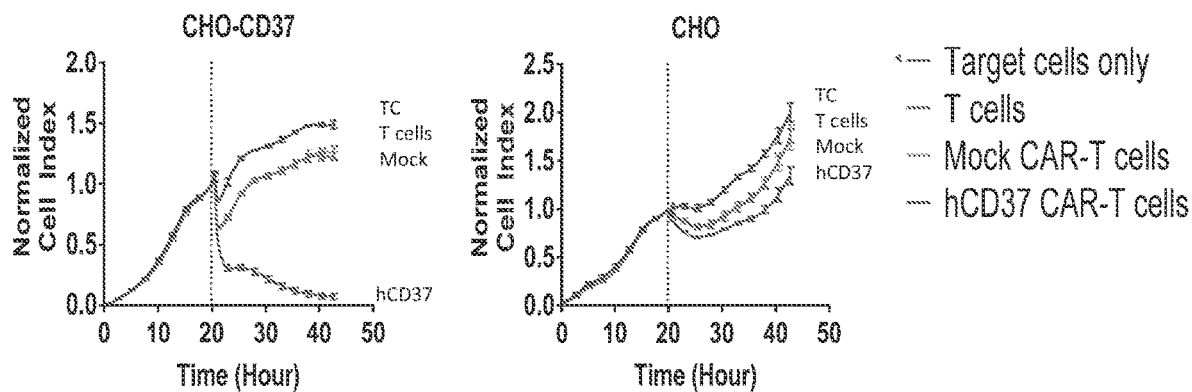
FIGS. 3A-3C. The humanized CD37-CAR-T cells (PMC930) specifically target CD37-positive cells.
Figure 3B:
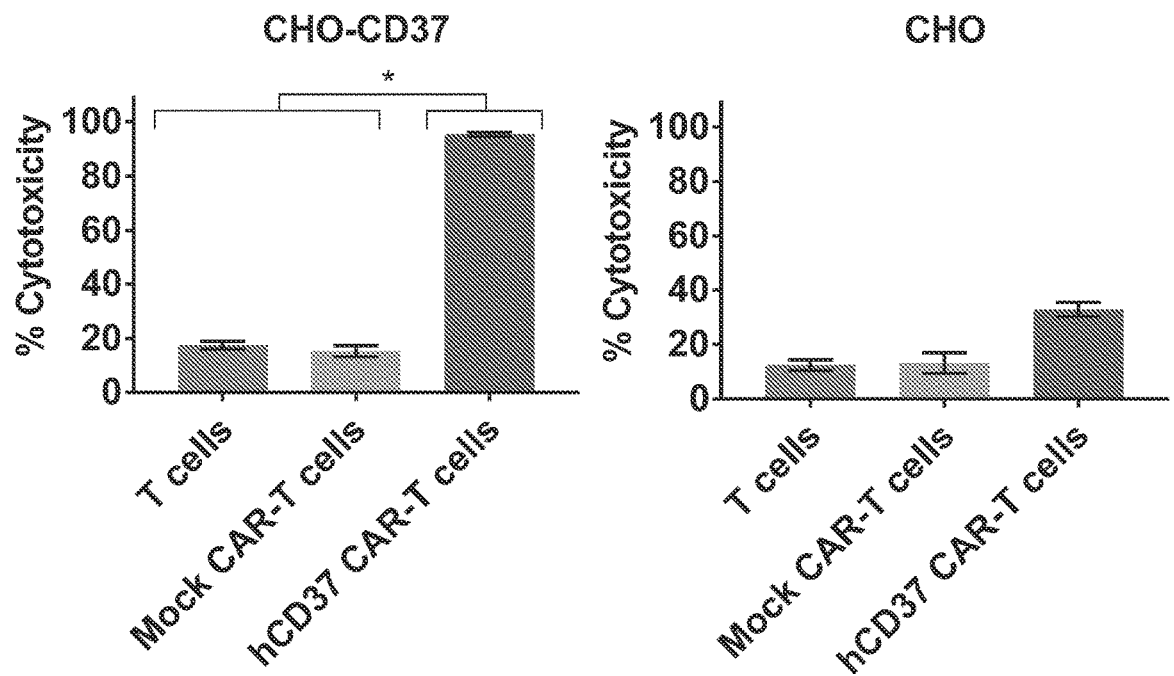
Figure 3C:
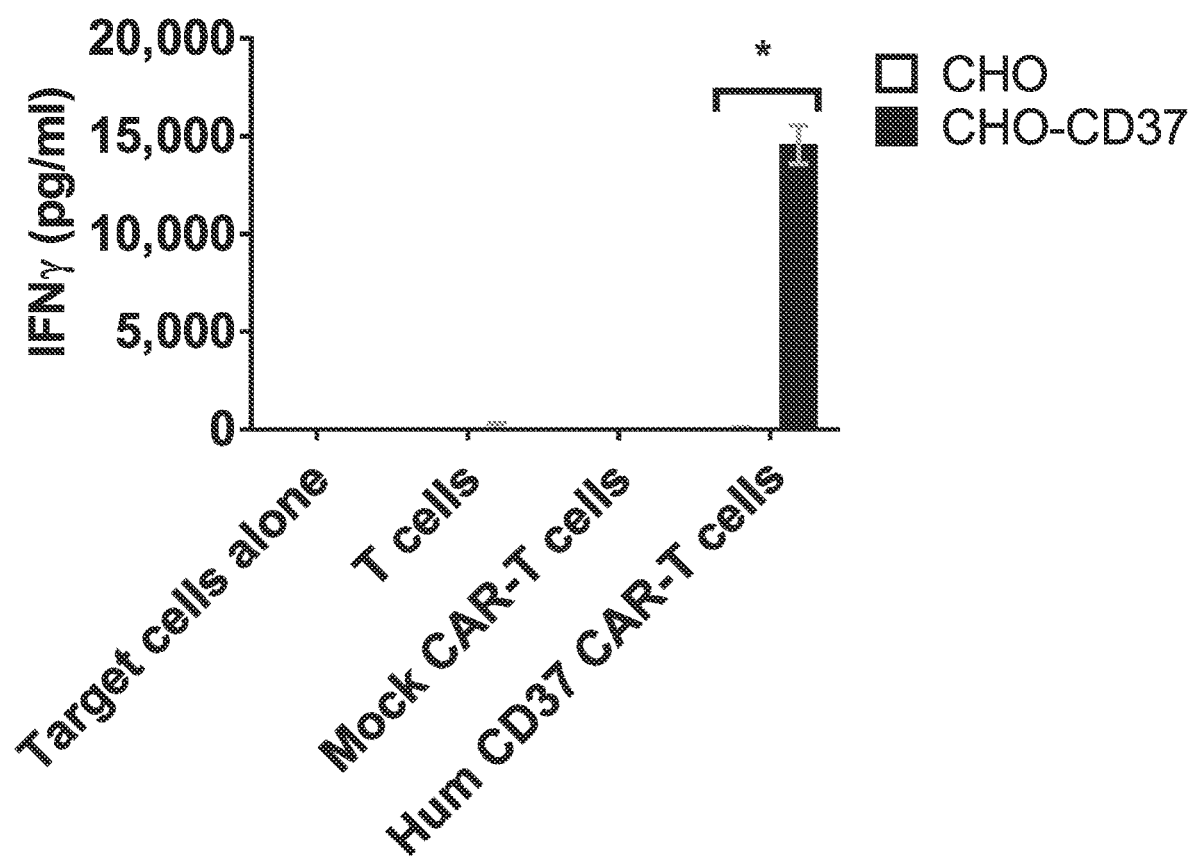

Example 15. Humanized CD37-CAR-T Cells (PMC762) Specifically Targeted CD37-Positive Cells We humanized CD37 VH and VL, as described in Materials and Methods, and generated lentiviral humanized CD37 CAR with a 4-1BB costimulatory domain and CD3 activation domain, called hCD37 CAR (PMC762). Surface expression of the CAR was detected by FACS with both anti-mouse Fab (72% positive) and anti-Human Fab (92% positive). In real-time cytotoxicity assay against CHO-CD37 and CHO cells, humanized anti-CD37 CAR-T cells (PMC762) effectively killed CHO-CD37 cells and demonstrated limited or no killing of CHO cells (FIG. 3A). Cytotoxicity of humanized CD37 CAR-T cells against CHO-CD37 (95.3%±0.8%) was significantly higher than non-transduced T cells (17.5%±1.3%) or mock CAR-T cells (FIG. 3B). The hCD37-CAR-T cells secreted significantly higher levels of IFN-gamma with CD37-positive target cells than with CD37-negative cells (FIG. 3C). Thus, humanized CD37-CAR-T cells specifically target CD37-positive cells.

Figure 4A:
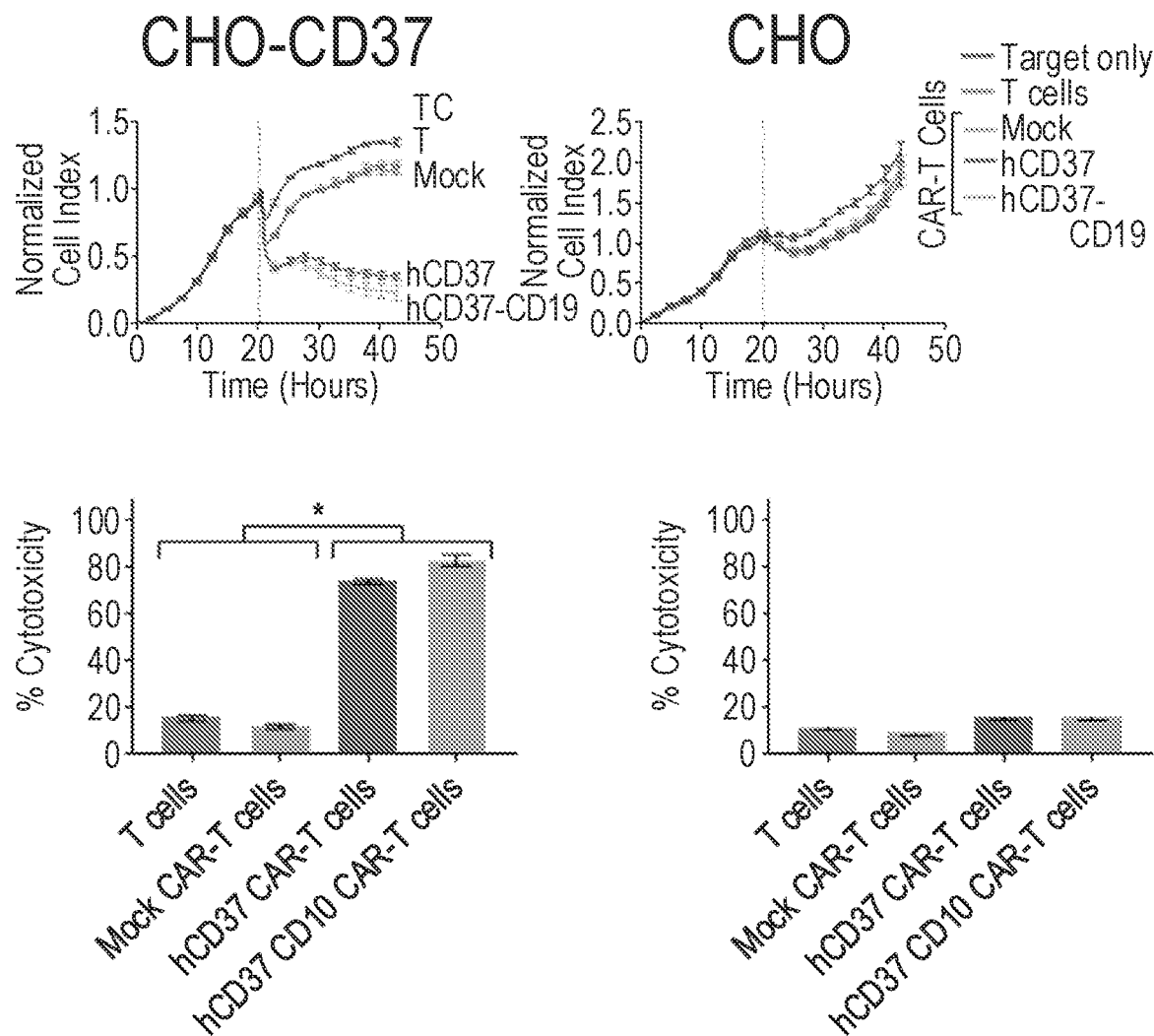
FIGS. 4A-4E. Bi-specific hCD37-CD19-CAR-T cells specifically target CD37-positive and CD19-positive cells.
Figure 4B:
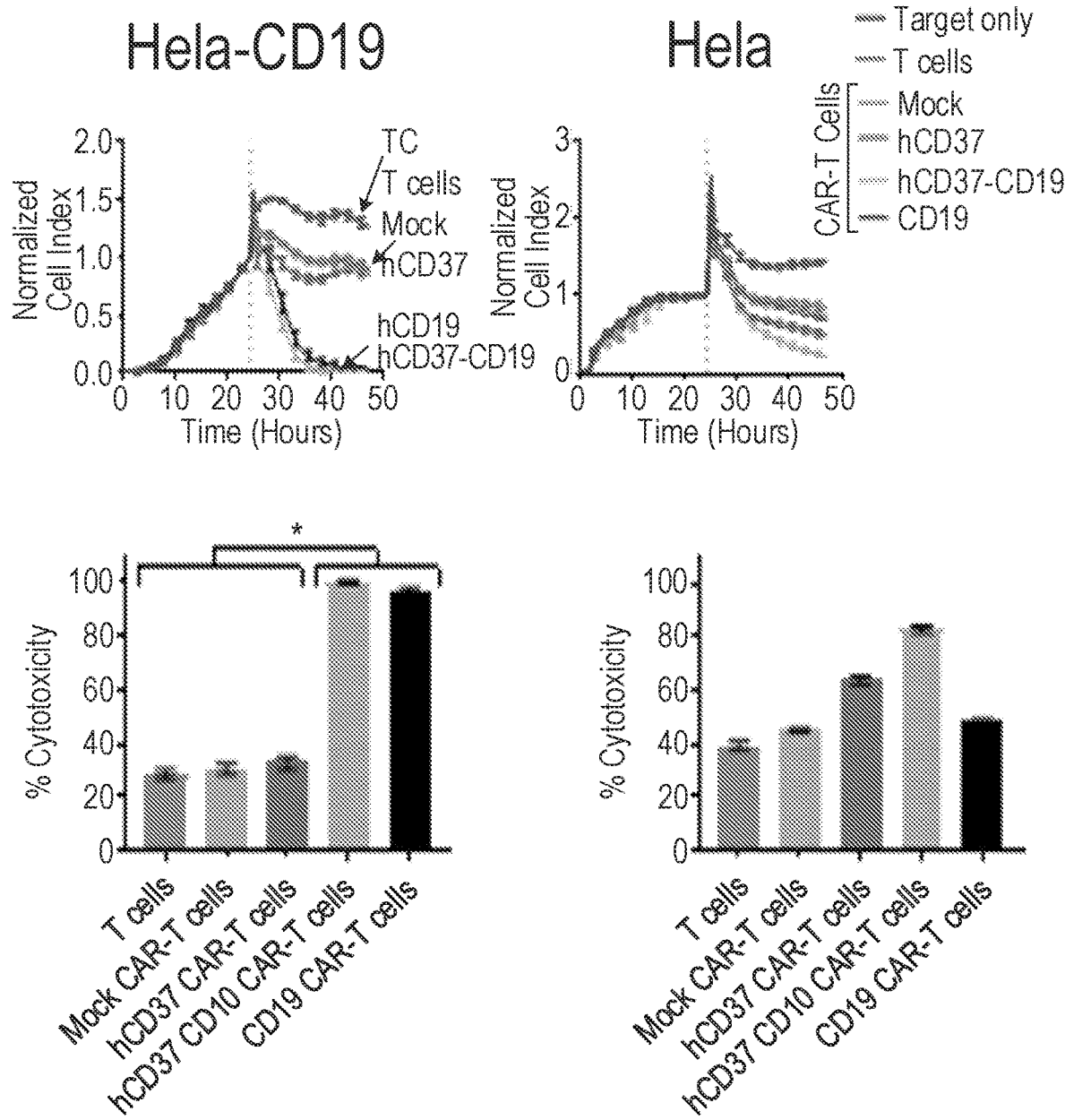

Example 16. Bispecific Humanized CD37-CD19 CAR-T Cells (PMC930) Specifically Targeted CD37-Positive Cells We tested the efficacy of bi-specific humanized hCD37-CD19 CAR-T cells (PMC930) in vitro. To generate bi-specific humanized CD37-CD19 CAR-T cells, we used the following design as shown in FIG. 2B with humanized CD37 ScFv. These CAR-T cells had a surface expression of CAR as detected by FACS with anti-human Fab antibodies (not shown). Real-time cytotoxicity assays were performed against CHO-CD37 and CHO cells (FIG. 4A) and against Hela-CD19 and Hela cells (FIG. 4B). Killing by bispecific hCD37-CD19 CAR-T cells was compared to CAR-T cells expressing monospecific hCD37 CAR or CD19 CAR. Bi-specific hCD37-CD19 CAR-T cells killed CHO-CD37 as effective as single hCD37-CAR-T cells and did not kill CHO cells (FIG. 4A).

Figure 4C:
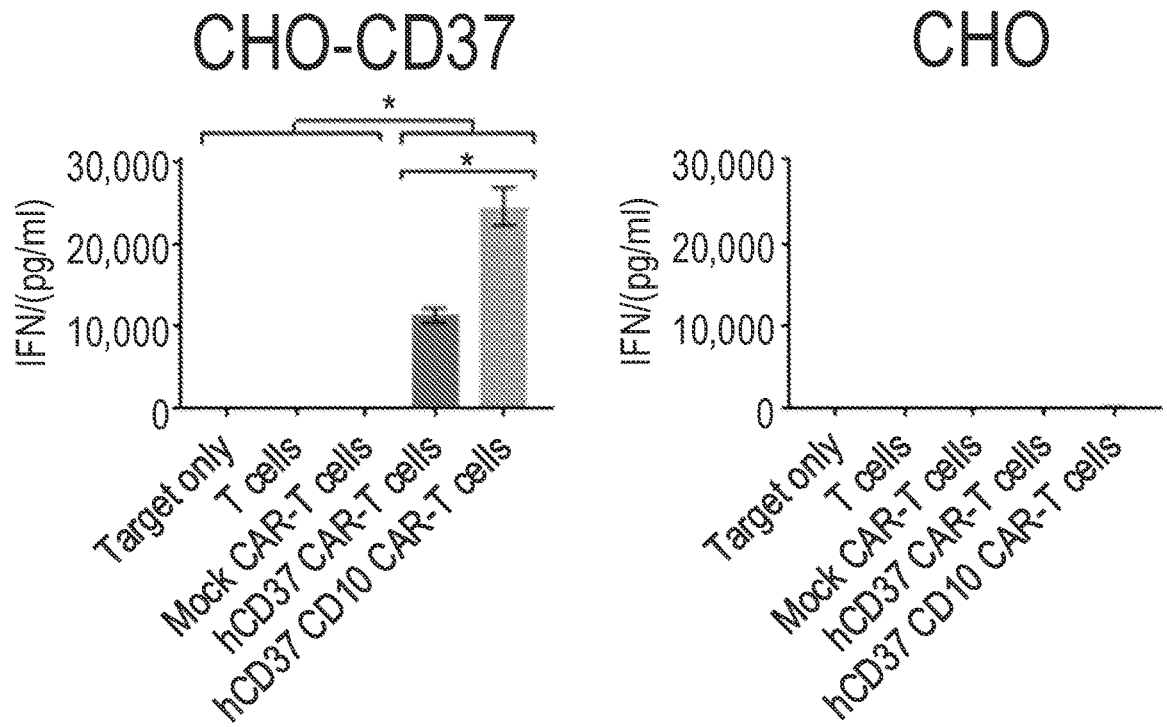
Figure 4D:
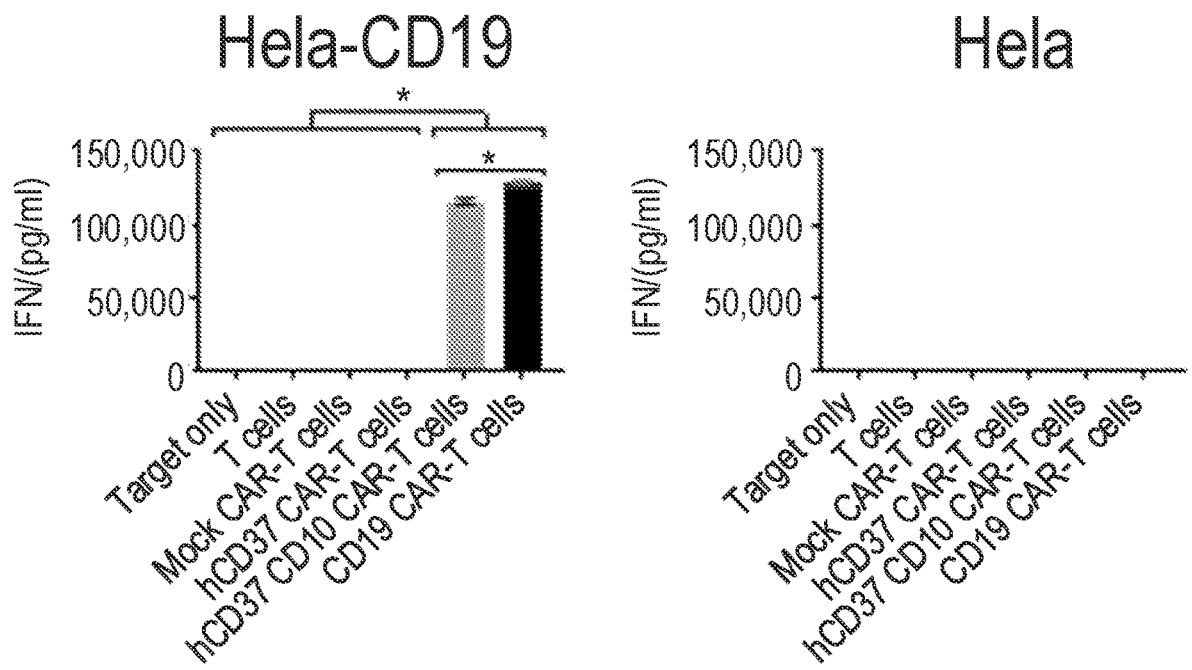

The hCD37-CD19 CAR-T cells also killed Hela-CD19 target cells and did not kill Hela cells (FIG. 4B). As expected, single hCD37-CAR-T cells did not kill Hela-CD19 cells. The hCD37-CD19 CAR-T cells and hCD37-CAR-T cells secreted significantly higher levels of IFN-gamma against CHO-CD37 cells versus CHO cells (FIG. 4C). Both hCD37-CD19 and CD19-CAR-T cells secreted significantly higher levels of IFN-gamma against Hela-CD19 target cells but not against Hela cells (FIG. 4D).

Figure 4E:
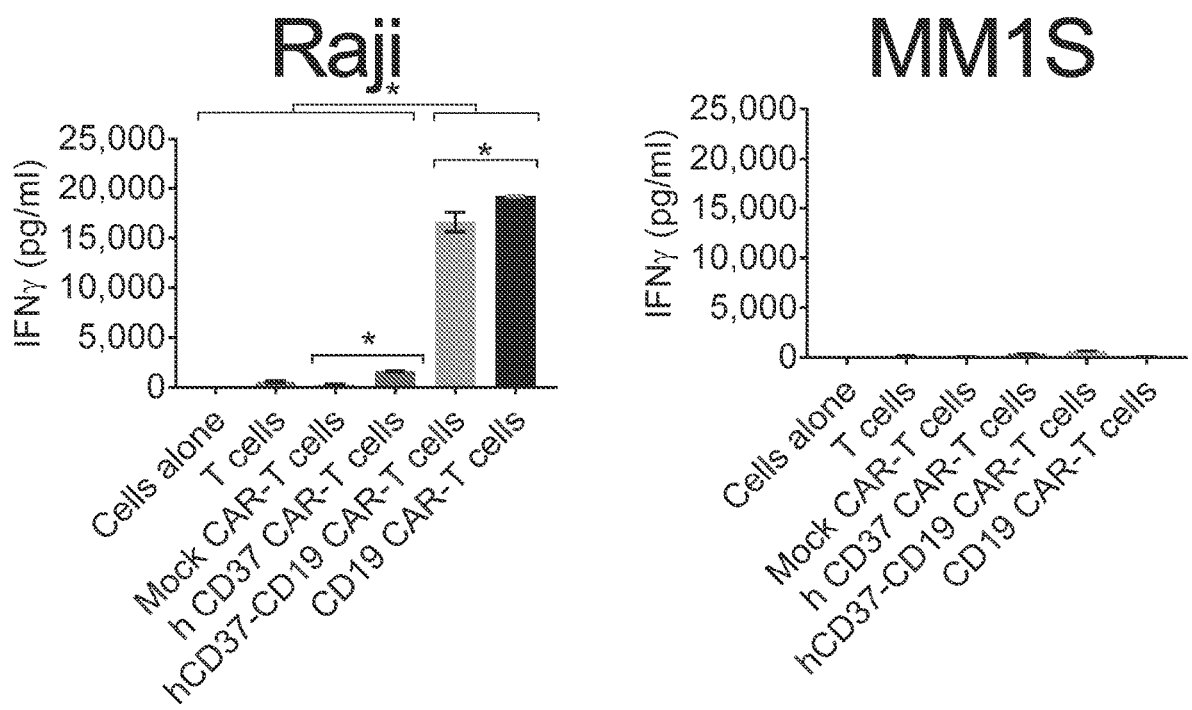

In separate co-culture experiments, IFN-γ release against Raji cells or MM1S cells was measured (FIG. 4E). Both CD37-CD19 CAR-T cells and CD19 CAR-T cells had significantly more IFN-γ release than humanized CD37 CAR-T cells, mock CAR-T cells, and non-transduced T cells ($p<0.0001$, Tukey's test) (FIG. 4E). The secretion of IFN-gamma was significantly higher for CD37-CD19-CAR-T cells against Raji cells than against MM1S cells.

Thus, hCD37-CD19 CAR-T cells demonstrate high and specific efficacy against CD37 and CD19-positive target cells in vitro.

Figure 5:
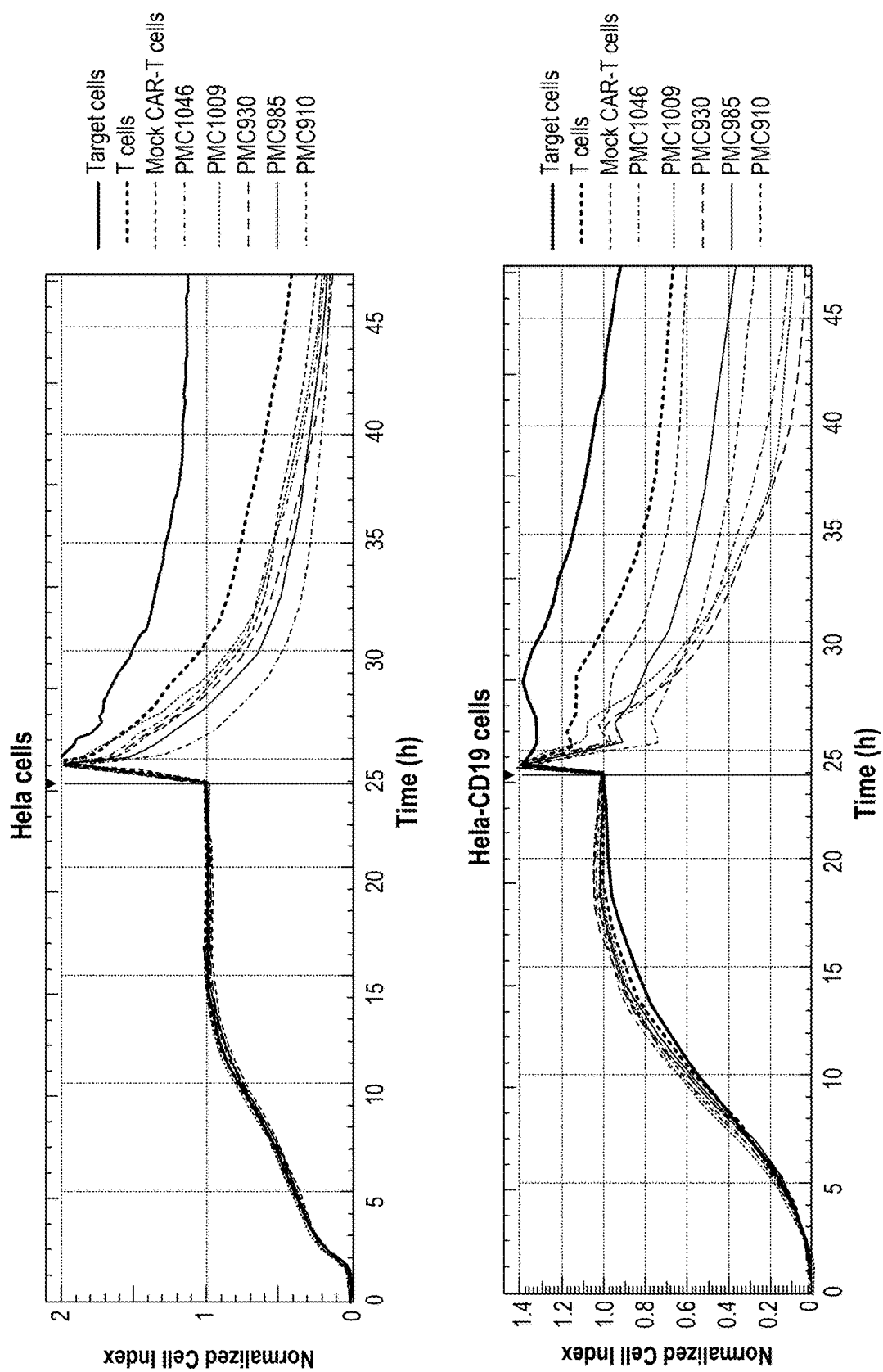
FIG. 5. RTCA assay comparing PMC985, PMC930 and PMC910 and PMC1046 using Hela-CD19, Hela cell lines. Humanized CD37 CAR: PMC985 and PMC910; bispecific CD19-CD37 CAR PMC930 and PMC1046.

Example 17. Comparison PMC985 (762), PMC910 and PMC930 and PMC1046 CAR-T Cells In Vitro We compared humanized CD37 CAR (PMC985) and bispecific CD19-CD37 CAR (PMC930) with another humanized CD37 (PMC910) and bispecific CD19-CD37 CAR (PMC1046) by RTCA. PMC985 CAR and PMC762 CAR have the same scFV and the same sequences; the only difference between PMC 985 CAR and PMC762 CAR is that the vector for creating PMC762 has AmpR, whereas the vector for creating PMC985 has Kan-R. We also used PMC1009 CD19-41BB-CD3 CAR-T cells. We prepared freshly viruses and used equal number of CAR+ cells and performed RTCA assay using CHO-CD37, CHO and Hela-CD19, Hela cells. PMC930 CAR-T cells were slightly more cytotoxic than PMC1046 in RTCA assay against Hela-CD19 cells (FIG. 5).

Figure 6:
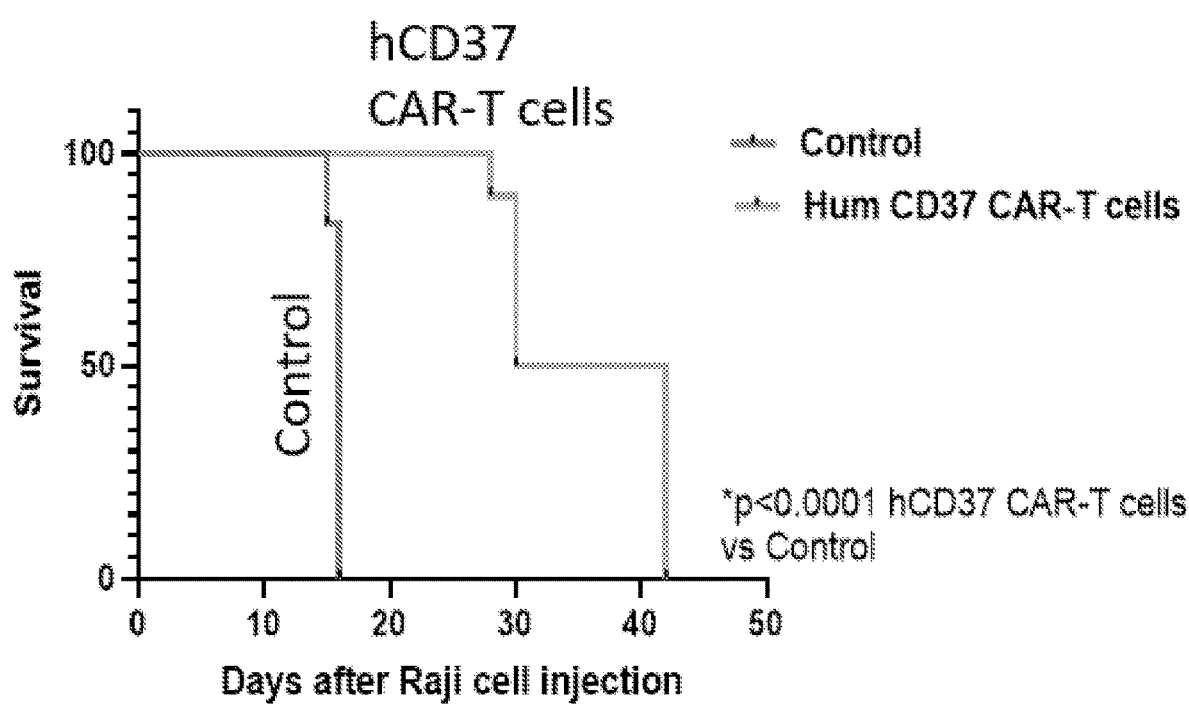
FIG. 6. Humanized CD37 CAR-T cells significantly block Raji xenograft tumor growth in vivo. Humanized CD37 CAR-T cells significantly prolong mouse survival in Raji xenograft mouse model. p<0.0001, Kaplan-Myer survival vs negative control group.

Example 18. Bispecific Humanized CD37-CD19 CAR-T Cells (PMC930) Inhibited Raji Lymphoma Xenograft Tumor Growth and Prolong Mice Survival At first, we tested the efficacy of CD37-CAR-T cells (PMC762) in vivo and performed survival analysis using a Raji-xenograft tumor model after an injection of humanized CD37-CAR-T cells (FIG. 6). Humanized CD37-CAR-T cells prolonged mouse survival as well as CD19-CAR-T cells (FIG. 6).

Figure 7A:
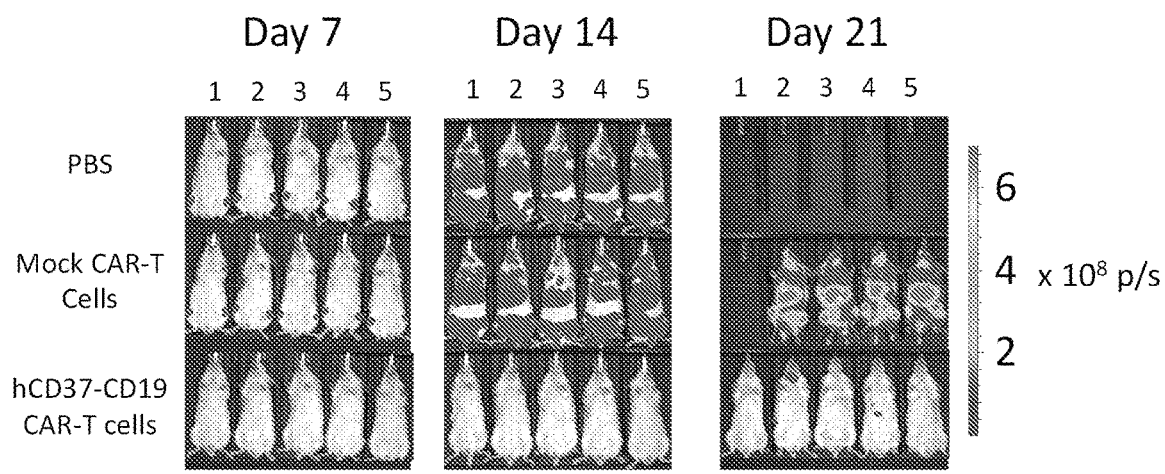
FIGS. 7A-7C. hCD37-CD19-CAR-T cells significantly block Raji xenograft tumor growth in vivo.
Figure 7B:
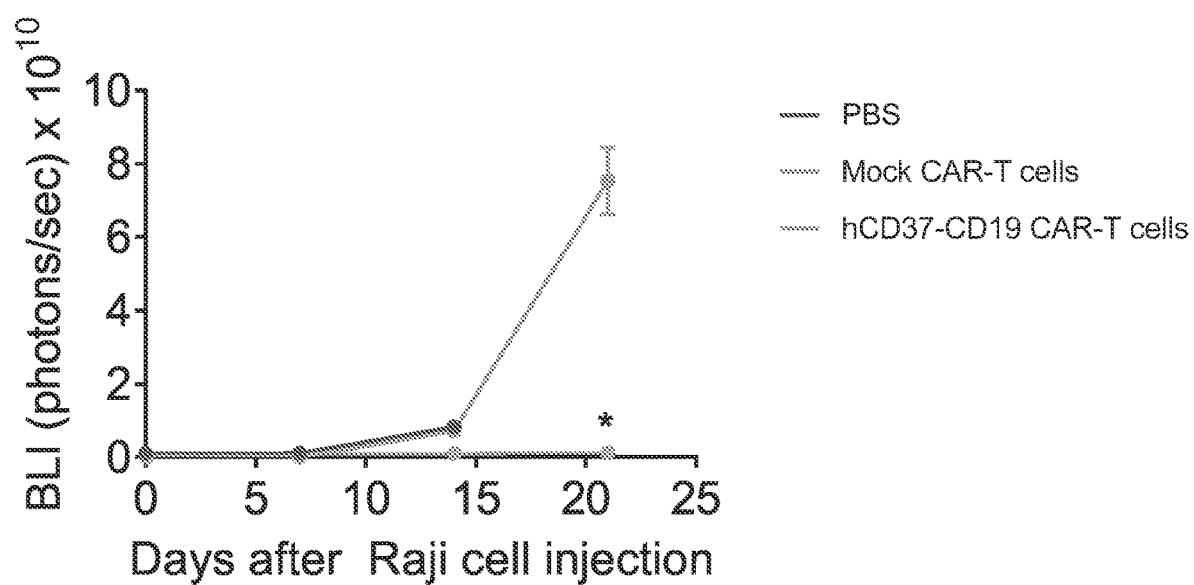
Figure 7C:
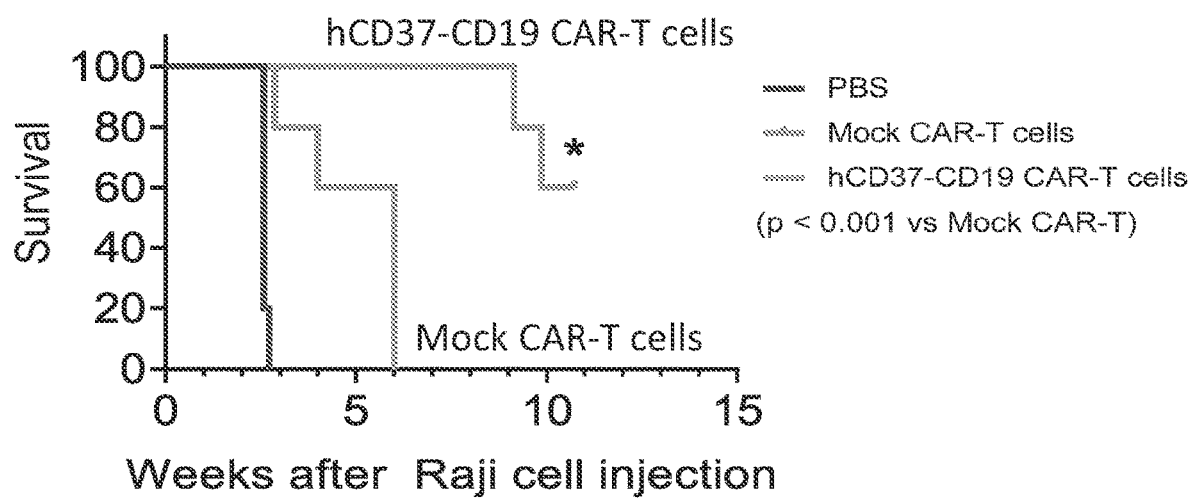

To test the efficacy of the bispecific humanized CD37-CD19 CAR-T cells in vivo, Nod Scid Gamma, NSG mice were injected with $5×10^5$ Raji-Luc cells followed 24 h later with $1×10^7$ humanized CD37-CD19 CAR-T cells, mock CAR-T cells, or vehicle. Tumor luminescence was detected in mice treated with mock CAR-T cells or vehicle but not in mice treated with CD37-CD19 CAR-T cells (FIG. 7A). Tumor luminescence in CD37-CD19 CAR-T cell treated mice was significantly lower than in mock CAR-T cell treated mice (FIG. 7B). Survival of CD37-CD19 CAR-T cell treated group was significantly longer (>75 days) (log-rank test $p<0.0001$) than vehicle (18 days) and mock CAR-T cell treated groups (FIG. 7C). Thus, humanized CD37 CAR-T cells and bi-specific hCD37-CD19 CAR-T cells are efficacious in the model in vivo.

REFERENCES

[1] M. V. Maus, A. R. Haas, G. L. Beatty, S. M. Albelda, B. L. Levine, X. Liu, Y. Zhao, M. Kalos, and C. H. June, T cells expressing chimeric antigen receptors can cause anaphylaxis in humans. Cancer Immunol Res 1 (2013) 26-31.

[2] M. V. Maus, S. A. Grupp, D. L. Porter, and C. H. June, Antibody-modified T cells: CARs take the front seat for hematologic malignancies. Blood 123 (2014) 2625-35.

[3] V. Golubovskaya, and L. Wu, Different Subsets of T Cells, Memory, Effector Functions, and CAR-T Immunotherapy. Cancers (Basel) 8, 36 (2016).

[4] F. Kroschinsky, J. M. Middeke, M. Janz, G. Lenz, M. Witzens-Harig, R. Bouabdallah, P. La Rosee, A. Viardot, G. Salles, S. J. Kim, T. M. Kim, O. Ottmann, J. Chromik, A. M. Quinson, U. von Wangenheim, U. Burkard, A. Berk, and N. Schmitz, Phase I dose escalation study of BI 836826 (CD37 antibody) in patients with relapsed or refractory B-cell non-Hodgkin lymphoma. Invest New Drugs (2020).

[5] Berahovich, R.; et al. CAR-T Cells Based on Novel BCMA Monoclonal Antibody Block Multiple Myeloma Cell Growth. Cancers 2018, 10, 323.

[6] Golubovskaya, V.; Berahovich, R.; Zhou, H.; Xu, S.; Harto, H.; Li, L.; Chao, C. C.; Mao, M. M.; Wu, L. CD47-CAR-T Cells Effectively Kill Target Cancer Cells and Block Pancreatic Tumor Growth. Cancers 2017, 9, 139.

[7] Almagro, J. C.; Fransson, J. Humanization of antibodies. Front. Biosci. 2008, 13, 1619-1633.

What is claimed is:

1. A humanized anti-human CD37 antibody or an antigen-binding fragment thereof comprising (i) VH having the amino acid sequence of SEQ ID NO: 3 and VL having the amino acid sequence of SEQ ID NO: 4.

2. The humanized anti-human CD37 antibody or an antigen-binding fragment thereof of claim 1, wherein the antibody or the antigen-binding fragment thereof is an scFv.

3. The humanized scFv of claim 2, which has the amino acid sequence of SEQ ID NO: 2.

* * * * *

SEQUENCE LISTING

<160> NUMBER OF SEQ ID NOS: 37

<210> SEQ ID NO 1
<211> LENGTH: 711
<212> TYPE: DNA
<213> ORGANISM: Homo sapiens

<400> SEQUENCE: 1

```
gaagtacaac tcgtcgagtc cggcggggga ctggtacagc ccggacggtc cctgagactt      60
agttgtacgg cttctggttt cacgttttcc gactattgga tgaattgggt gaggcaagcg     120
cccggtaaag gcctggaatg ggtgggacaa attcgcgata agccgtataa ttacgaaaca     180
ttctacagcg actctgtcaa gggtagattc acaatctccc gggatgacag taaatccatt     240
gcatacctcc agatgaactc tctcaaaacc gaggatacag ctgtatatta ttgcactggg     300
agtttcgcct actggggagc tgggacgacg gtaacggtat cctcaggtgg cggtggaagc     360
ggtggtggag gtagtggagg gggtgggagt gccattagga tgactcagag ccccagttct     420
ttcagtgcat caacaggaga cagagtaacg ataacgtgcc gggcaagcgg taacatccat     480
aattaccttg cgtggtacca acagaaacct ggtaaagcgc cgaaacttct catttacaat     540
gctaagaccc ttccctccgg agttccctct aggtttagtg gctcaggtag cgggaccgac     600
tttaccttga caatcagttg cctgcaatca gaagactttg caacttacta ctgccaacag     660
tattggagca ccccctatac gtttggcggc ggtactaaac tggaaatccg c             711
```

<210> SEQ ID NO 2
<211> LENGTH: 237
<212> TYPE: PRT
<213> ORGANISM: Homo sapiens

<400> SEQUENCE: 2

Glu Val Gln Leu Val Glu Ser Gly Gly Gly Leu Val Gln Pro Gly Arg
1               5                   10                  15

Ser Leu Arg Leu Ser Cys Thr Ala Ser Gly Phe Thr Phe Ser Asp Tyr
            20                  25                  30

Trp Met Asn Trp Val Arg Gln Ala Pro Gly Lys Gly Leu Glu Trp Val
        35                  40                  45

Gly Gln Ile Arg Asp Lys Pro Tyr Asn Tyr Glu Thr Phe Tyr Ser Asp
    50                  55                  60

Ser Val Lys Gly Arg Phe Thr Ile Ser Arg Asp Asp Ser Lys Ser Ile
65                  70                  75                  80

Ala Tyr Leu Gln Met Asn Ser Leu Lys Thr Glu Asp Thr Ala Val Tyr
                85                  90                  95

Tyr Cys Thr Gly Ser Phe Ala Tyr Trp Gly Ala Gly Thr Thr Val Thr
            100                 105                 110

Val Ser Ser Gly Gly Gly Gly Ser Gly Gly Gly Gly Ser Gly Gly Gly
        115                 120                 125

Gly Ser Ala Ile Arg Met Thr Gln Ser Pro Ser Ser Phe Ser Ala Ser
    130                 135                 140

Thr Gly Asp Arg Val Thr Ile Thr Cys Arg Ala Ser Gly Asn Ile His
145                 150                 155                 160

Asn Tyr Leu Ala Trp Tyr Gln Gln Lys Pro Gly Lys Ala Pro Lys Leu
                165                 170                 175

Leu Ile Tyr Asn Ala Lys Thr Leu Pro Ser Gly Val Pro Ser Arg Phe
            180                 185                 190

Ser Gly Ser Gly Ser Gly Thr Asp Phe Thr Leu Thr Ile Ser Cys Leu 195                 200                 205
Gln Ser Glu Asp Phe Ala Thr Tyr Tyr Cys Gln Gln Tyr Trp Ser Thr
        210                 215                 220

Pro Tyr Thr Phe Gly Gly Gly Thr Lys Leu Glu Ile Arg
225                 230                 235

<210> SEQ ID NO 3
<211> LENGTH: 115
<212> TYPE: PRT
<213> ORGANISM: Homo sapiens

<400> SEQUENCE: 3

Glu Val Gln Leu Val Glu Ser Gly Gly Gly Leu Val Gln Pro Gly Arg
1               5                   10                  15

Ser Leu Arg Leu Ser Cys Thr Ala Ser Gly Phe Thr Phe Ser Asp Tyr
            20                  25                  30

Trp Met Asn Trp Val Arg Gln Ala Pro Gly Lys Gly Leu Glu Trp Val
        35                  40                  45

Gly Gln Ile Arg Asp Lys Pro Tyr Asn Tyr Glu Thr Phe Tyr Ser Asp
    50                  55                  60

Ser Val Lys Gly Arg Phe Thr Ile Ser Arg Asp Asp Ser Lys Ser Ile
65                  70                  75                  80

Ala Tyr Leu Gln Met Asn Ser Leu Lys Thr Glu Asp Thr Ala Val Tyr
                85                  90                  95

Tyr Cys Thr Gly Ser Phe Ala Tyr Trp Gly Ala Gly Thr Thr Val Thr
            100                 105                 110

Val Ser Ser
        115

<210> SEQ ID NO 4
<211> LENGTH: 107
<212> TYPE: PRT
<213> ORGANISM: Homo sapiens

<400> SEQUENCE: 4

Ala Ile Arg Met Thr Gln Ser Pro Ser Ser Phe Ser Ala Ser Thr Gly
1               5                   10                  15

Asp Arg Val Thr Ile Thr Cys Arg Ala Ser Gly Asn Ile His Asn Tyr
            20                  25                  30

Leu Ala Trp Tyr Gln Gln Lys Pro Gly Lys Ala Pro Lys Leu Leu Ile
        35                  40                  45

Tyr Asn Ala Lys Thr Leu Pro Ser Gly Val Pro Ser Arg Phe Ser Gly
    50                  55                  60

Ser Gly Ser Gly Thr Asp Phe Thr Leu Thr Ile Ser Cys Leu Gln Ser
65                  70                  75                  80

Glu Asp Phe Ala Thr Tyr Tyr Cys Gln Gln Tyr Trp Ser Thr Pro Tyr
                85                  90                  95

Thr Phe Gly Gly Gly Thr Lys Leu Glu Ile Arg
            100                 105

<210> SEQ ID NO 5
<211> LENGTH: 15
<212> TYPE: PRT
<213> ORGANISM: Artificial Sequence
<220> FEATURE:
<223> OTHER INFORMATION: Synthetic

<400> SEQUENCE: 5

Gly Gly Gly Gly Ser Gly Gly Gly Ser Gly Gly Gly Ser
1               5                   10                  15

<210> SEQ ID NO 6
<211> LENGTH: 711
<212> TYPE: DNA
<213> ORGANISM: Homo sapiens

<400> SEQUENCE: 6
caggtgcagc ttgtcgagag tggaggtggc gtcgttcaac ctggtagaag tttgcggctc         60
tcatgtgcgg cctctggatt tactttttct gactactgga tgaactgggt caggcaagct        120
ccaggtaagg ggcttgaatg ggtggcgcag atccgggata agccatacaa ctacgagacg        180
ttctactcag acagtgtaaa gggcagattt actataagta gagataattc aaagaacacg        240
ctctatcttc agatgaattc attgagagcg aggacacgg cggtgtacta ctgtactggc        300
agctttgcgt actggggagc tggacaacg gtaacggtat cttctggagg aggaggtagt        360 ggcggggtg gctctggagg tggcggctct gatatacaaa tgactcaaag tccatctagt        420
ctcagcgcca gcgtgggcga cagggtcact ataacgtgtc gagcgtctgg caatatacac        480
aattacttgg cgtggtatca gcaaaaaccg ggaaaagcgc cgaagctgct catatataat        540
gcgaaaactt tgccatcagg cgttccttcc cggttctcag gctccggttc tggaacggac        600
tttactctca ctatcagtag ccttcagcca gaggacttcg ccacttacta ttgccagcaa        660
tattggtcta ctccttacac ctttggggga gggaccaaat ggaaatccg c                  711

<210> SEQ ID NO 7
<211> LENGTH: 237
<212> TYPE: PRT
<213> ORGANISM: Homo sapiens

<400> SEQUENCE: 7

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Asp Tyr
                20                  25                  30

Trp Met Asn Trp Val Arg Gln Ala Pro Gly Lys Gly Leu Glu Trp Val
            35                  40                  45

Ala Gln Ile Arg Asp Lys Pro Tyr Asn Tyr Glu Thr Phe Tyr Ser Asp
        50                  55                  60

Ser Val Lys Gly Arg Phe Thr Ile Ser Arg Asp Asn Ser Lys Asn Thr
65                  70                  75                  80

Leu Tyr Leu Gln Met Asn Ser Leu Arg Ala Glu Asp Thr Ala Val Tyr
                85                  90                  95

Tyr Cys Thr Gly Ser Phe Ala Tyr Trp Gly Ala Gly Thr Thr Val Thr
            100                 105                 110

Val Ser Ser Gly Gly Gly Gly Ser Gly Gly Gly Gly Ser Gly Gly Gly
        115                 120                 125

Gly Ser Asp Ile Gln Met Thr Gln Ser Pro Ser Ser Leu Ser Ala Ser
    130                 135                 140

Val Gly Asp Arg Val Thr Ile Thr Cys Arg Ala Ser Gly Asn Ile His
145                 150                 155                 160

Asn Tyr Leu Ala Trp Tyr Gln Gln Lys Pro Gly Lys Ala Pro Lys Leu
                165                 170                 175

Leu Ile Tyr Asn Ala Lys Thr Leu Pro Ser Gly Val Pro Ser Arg Phe
            180                 185                 190

Ser Gly Ser Gly Ser Gly Thr Asp Phe Thr Leu Thr Ile Ser Ser Leu
            195                 200                 205

Gln Pro Glu Asp Phe Ala Thr Tyr Tyr Cys Gln Gln Tyr Trp Ser Thr
        210                 215                 220

Pro Tyr Thr Phe Gly Gly Gly Thr Lys Leu Glu Ile Arg
225                 230                 235

<210> SEQ ID NO 8
<211> LENGTH: 115
<212> TYPE: PRT
<213> ORGANISM: Homo sapiens

<400> SEQUENCE: 8

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Asp Tyr
            20                  25                  30

Trp Met Asn Trp Val Arg Gln Ala Pro Gly Lys Gly Leu Glu Trp Val
        35                  40                  45

Ala Gln Ile Arg Asp Lys Pro Tyr Asn Tyr Glu Thr Phe Tyr Ser Asp
    50                  55                  60

Ser Val Lys Gly Arg Phe Thr Ile Ser Arg Asp Asn Ser Lys Asn Thr
65                  70                  75                  80

Leu Tyr Leu Gln Met Asn Ser Leu Arg Ala Glu Asp Thr Ala Val Tyr
                85                  90                  95

Tyr Cys Thr Gly Ser Phe Ala Tyr Trp Gly Ala Gly Thr Thr Val Thr
            100                 105                 110

Val Ser Ser
        115

<210> SEQ ID NO 9
<211> LENGTH: 107
<212> TYPE: PRT
<213> ORGANISM: Homo sapiens

<400> SEQUENCE: 9

Asp Ile Gln Met Thr Gln Ser Pro Ser Ser Leu Ser Ala Ser Val Gly
1               5                   10                  15

Asp Arg Val Thr Ile Thr Cys Arg Ala Ser Gly Asn Ile His Asn Tyr
            20                  25                  30

Leu Ala Trp Tyr Gln Gln Lys Pro Gly Lys Ala Pro Lys Leu Leu Ile
        35                  40                  45

Tyr Asn Ala Lys Thr Leu Pro Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Trp Ser Thr Pro Tyr
                85                  90                  95

Thr Phe Gly Gly Gly Thr Lys Leu Glu Ile Arg
            100                 105

<210> SEQ ID NO 10
<211> LENGTH: 69
<212> TYPE: DNA
<213> ORGANISM: Homo sapiens

<400> SEQUENCE: 10 atggcttac cagtgaccgc cttgctcctg ccgctggcct tgctgctcca cgccgccagg      60
ccggctagc                                                                   69

<210> SEQ ID NO 11
<211> LENGTH: 23
<212> TYPE: PRT
<213> ORGANISM: Homo sapiens

<400> SEQUENCE: 11

Met Ala Leu Pro Val Thr Ala Leu Leu Leu Pro Leu Ala Leu Leu Leu
1               5                   10                  15

His Ala Ala Arg Pro Ala Ser
            20

<210> SEQ ID NO 12
<211> LENGTH: 135
<212> TYPE: DNA
<213> ORGANISM: Homo sapiens

<400> SEQUENCE: 12
accacgacgc cagcgccgcg accaccaaca ccggcgccca ccatcgcgtc gcagcccctg      60
tccctgcgcc agaggcgag ccggccagcg gcggggggcg cagtgcacac gagggggctg     120
gacttcgcca gtgat                                                    135

<210> SEQ ID NO 13
<211> LENGTH: 45
<212> TYPE: PRT
<213> ORGANISM: Homo sapiens

<400> SEQUENCE: 13

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Ser Arg Pro Ala Ala Gly
            20                  25                  30

Gly Ala Val His Thr Arg Gly Leu Asp Phe Ala Ser Asp
        35                  40                  45

<210> SEQ ID NO 14
<211> LENGTH: 87
<212> TYPE: DNA
<213> ORGANISM: Homo sapiens

<400> SEQUENCE: 14
aagccctttt gggtgctggt ggtggttggt ggagtcctgg cttgctatag cttgctagta      60
acagtggcct ttattatttt ctgggtg                                          87

<210> SEQ ID NO 15
<211> LENGTH: 29
<212> TYPE: PRT
<213> ORGANISM: Homo sapiens

<400> SEQUENCE: 15

Lys Pro Phe Trp Val Leu Val Val Val Gly Gly Val Leu Ala Cys Tyr
1               5                   10                  15

Ser Leu Leu Val Thr Val Ala Phe Ile Ile Phe Trp Val
            20                  25

<210> SEQ ID NO 16
<211> LENGTH: 126
<212> TYPE: DNA
<213> ORGANISM: Homo sapiens

<400> SEQUENCE: 16
aaacggggca gaaagaaact cctgtatata ttcaaacaac catttatgag accagtacaa    60
actactcaag aggaagatgg ctgtagctgc cgatttccag aagaagaaga aggaggatgt   120
gaactg                                                              126

<210> SEQ ID NO 17
<211> LENGTH: 42
<212> TYPE: PRT
<213> ORGANISM: Homo sapiens

<400> SEQUENCE: 17

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
        35                  40

<210> SEQ ID NO 18
<211> LENGTH: 342
<212> TYPE: DNA
<213> ORGANISM: Homo sapiens

<400> SEQUENCE: 18
agagtgaagt tcagcaggag cgcagacgcc cccgcgtacc agcagggcca gaaccagctc    60
tataacgagc tcaatctagg acgaagagag gagtacgatg ttttggacaa gagacgtggc   120
cgggaccctg agatgggggg aaagccgcag agaaggaaga accctcagga aggcctgtac   180
aatgaactgc agaaagataa gatggcggag gcctacagtg agattgggat gaaaggcgag   240
cgccggaggg gcaaggggca cgatggcctt taccagggtc tcagtacagc caccaaggac   300
acctacgacg cccttcacat gcaggccctg cccccctcgct aa                     342

<210> SEQ ID NO 19
<211> LENGTH: 113
<212> TYPE: PRT
<213> ORGANISM: Homo sapiens

<400> SEQUENCE: 19

Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Gln Arg Arg Lys Asn Pro Gln Glu Gly Leu Tyr Asn Glu Leu Gln
    50                  55                  60

Lys Asp Lys Met Ala Glu Ala Tyr Ser Glu Ile Gly Met Lys Gly Glu
65                  70                  75                  80

Arg Arg Arg Gly Lys Gly His Asp Gly Leu Tyr Gln Gly Leu Ser Thr
                85                  90                  95

Ala Thr Lys Asp Thr Tyr Asp Ala Leu His Met Gln Ala Leu Pro Pro
                100                 105                 110

Arg

<210> SEQ ID NO 20

<211> LENGTH: 1482
<212> TYPE: DNA
<213> ORGANISM: Homo sapiens

<400> SEQUENCE: 20

```
atggccttac cagtgaccgc cttgctcctg ccgctggcct tgctgctcca cgccgccagg      60
ccggctagcg aagtacaact cgtcgagtcc ggcggggggac tggtacagcc cggacggtcc    120
ctgagactta gttgtacggc ttctggtttc acgttttccg actattggat gaattgggtg    180
aggcaagcgc ccggtaaagg cctggaatgg gtgggacaaa ttcgcgataa gccgtataat    240
tacgaaacat tctacagcga ctctgtcaag ggtagattca caatctcccg ggatgacagt    300
aaatccattg catacctcca gatgaactct ctcaaaaccg aggatacagc tgtatattat    360
tgcactggga gtttcgccta ctggggagct gggacgacgg taacggtatc ctcaggtggc    420
ggtggaagcg gtggtggagg tagtggaggg ggtgggagtg ccattaggat gactcagagc    480
cccagttctt tcagtgcatc aacaggagac agagtaacga taacgtgccg ggcaagcgt     540
aacatccata attaccttgc gtggtaccaa cagaaacctg gtaaagcgcc gaaacttctc    600
atttacaatg ctaagaccct tccctccgga gttccctcta ggtttagtgg ctcaggtagc    660
gggaccgact ttaccttgac aatcagttgc ctgcaatcag aagactttgc aacttactac    720
tgccaacagt attggagcac ccctatacg tttggcggcg gtactaaact ggaaatccgc    780
ctcgagaagc ccaccacgac gccagcgccg cgaccaccaa caccggcgcc caccatcgcg    840
tcgcagcccc tgtccctgcg cccagaggcg agccggccag cggcgggggg cgcagtgcac    900
acgagggggc tggacttcgc cagtgataag cccttttggg tgctggtggt ggttggtgga    960
gtcctggctt gctatagctt gctagtaaca gtggcctta ttattttctg ggtgaaacgg    1020
ggcagaaaga aactcctgta tatattcaaa caaccattta tgagaccagt acaaactact   1080
caagaggaag atggctgtag ctgccgattt ccagaagaag aagaaggagg atgtgaactg   1140
agagtgaagt tcagcaggag cgcagacgcc ccgcgctacc agcagggcca gaaccagctc   1200
tataacgagc tcaatctagg acgaagagag gagtacgatg ttttggacaa gagacgtggc   1260
cgggaccctg agatgggggg aaagccgcag agaaggaaga accctcagga aggcctgtac   1320
aatgaactgc agaaagataa gatggcggag gcctacagtg agattgggat gaaaggcgag   1380
cgccggaggg gcaaggggca cgatggcctt taccagggtc tcagtacagc caccaaggac   1440
acctacgacg cccttcacat gcaggccctg ccccctcgct aa                      1482
```

<210> SEQ ID NO 21
<211> LENGTH: 493
<212> TYPE: PRT
<213> ORGANISM: Homo sapiens

<400> SEQUENCE: 21

```
Met Ala Leu Pro Val Thr Ala Leu Leu Leu Pro Leu Ala Leu Leu Leu
1               5                   10                  15

His Ala Ala Arg Pro Ala Ser Glu Val Gln Leu Val Glu Ser Gly Gly
                20                  25                  30

Gly Leu Val Gln Pro Gly Arg Ser Leu Arg Leu Ser Cys Thr Ala Ser
            35                  40                  45

Gly Phe Thr Phe Ser Asp Tyr Trp Met Asn Trp Val Arg Gln Ala Pro
        50                  55                  60

Gly Lys Gly Leu Glu Trp Val Gly Gln Ile Arg Asp Lys Pro Tyr Asn
65                  70                  75                  80
```

-continued

```
Tyr Glu Thr Phe Tyr Ser Asp Ser Val Lys Gly Arg Phe Thr Ile Ser
                85                  90                  95
Arg Asp Asp Ser Lys Ser Ile Ala Tyr Leu Gln Met Asn Ser Leu Lys
            100                 105                 110
Thr Glu Asp Thr Ala Val Tyr Tyr Cys Thr Gly Ser Phe Ala Tyr Trp
            115                 120                 125
Gly Ala Gly Thr Thr Val Thr Val Ser Ser Gly Gly Gly Gly Ser Gly
130                 135                 140
Gly Gly Gly Ser Gly Gly Gly Gly Ser Ala Ile Arg Met Thr Gln Ser
145                 150                 155                 160
Pro Ser Ser Phe Ser Ala Ser Thr Gly Asp Arg Val Thr Ile Thr Cys
                165                 170                 175
Arg Ala Ser Gly Asn Ile His Asn Tyr Leu Ala Trp Tyr Gln Gln Lys
            180                 185                 190
Pro Gly Lys Ala Pro Lys Leu Leu Ile Tyr Asn Ala Lys Thr Leu Pro
            195                 200                 205
Ser Gly Val Pro Ser Arg Phe Ser Gly Ser Gly Ser Gly Thr Asp Phe
210                 215                 220
Thr Leu Thr Ile Ser Cys Leu Gln Ser Glu Asp Phe Ala Thr Tyr Tyr
225                 230                 235                 240
Cys Gln Gln Tyr Trp Ser Thr Pro Tyr Thr Phe Gly Gly Gly Thr Lys
                245                 250                 255
Leu Glu Ile Arg Leu Glu Lys Pro Thr Thr Thr Pro Ala Pro Arg Pro
            260                 265                 270
Pro Thr Pro Ala Pro Thr Ile Ala Ser Gln Pro Leu Ser Leu Arg Pro
            275                 280                 285
Glu Ala Ser Arg Pro Ala Ala Gly Gly Ala Val His Thr Arg Gly Leu
290                 295                 300
Asp Phe Ala Ser Asp Lys Pro Phe Trp Val Leu Val Val Val Gly Gly
305                 310                 315                 320
Val Leu Ala Cys Tyr Ser Leu Leu Val Thr Val Ala Phe Ile Ile Phe
                325                 330                 335
Trp Val Lys Arg Gly Arg Lys Lys Leu Leu Tyr Ile Phe Lys Gln Pro
            340                 345                 350
Phe Met Arg Pro Val Gln Thr Thr Gln Glu Glu Asp Gly Cys Ser Cys
            355                 360                 365
Arg Phe Pro Glu Glu Glu Glu Gly Gly Cys Glu Leu Arg Val Lys Phe
370                 375                 380
Ser Arg Ser Ala Asp Ala Pro Ala Tyr Gln Gln Gly Gln Asn Gln Leu
385                 390                 395                 400
Tyr Asn Glu Leu Asn Leu Gly Arg Arg Glu Glu Tyr Asp Val Leu Asp
                405                 410                 415
Lys Arg Arg Gly Arg Asp Pro Glu Met Gly Gly Lys Pro Gln Arg Arg
            420                 425                 430
Lys Asn Pro Gln Glu Gly Leu Tyr Asn Glu Leu Gln Lys Asp Lys Met
            435                 440                 445
Ala Glu Ala Tyr Ser Glu Ile Gly Met Lys Gly Glu Arg Arg Arg Gly
450                 455                 460
Lys Gly His Asp Gly Leu Tyr Gln Gly Leu Ser Thr Ala Thr Lys Asp
465                 470                 475                 480
Thr Tyr Asp Ala Leu His Met Gln Ala Leu Pro Pro Arg
                485                 490
```

<210> SEQ ID NO 22
<211> LENGTH: 1482
<212> TYPE: DNA
<213> ORGANISM: Homo sapiens

<400> SEQUENCE: 22

```
atggccttac cagtgaccgc cttgctcctg ccgctggcct tgctgctcca cgccgccagg     60
ccggctagcc aggtgcagct tgtcgagagt ggaggtggcg tcgttcaacc tggtagaagt    120
ttgcggctct catgtgcggc ctctggattt acttttctg actactgat gaactgggtc      180
aggcaagctc caggtaaggg gcttgaatgg gtggcgcaga tccgggataa gccatacaac    240
tacgagacgt tctactcaga cagtgtaaag ggcagattta ctataagtag agataattca    300
aagaacacgc tctatcttca gatgaattca ttgagagcgg aggacacggc ggtgtactac    360
tgtactggca gctttgcgta ctggggagct gggacaacgg taacggtatc ttctggagga    420
ggaggtagtg gcggggtgg ctctggaggt ggcggctctg atatacaaat gactcaaagt    480
ccatctagtc tcagcgccag cgtgggcgac agggtcacta acgtgtcg agcgtctggc     540
aatatacaca attacttggc gtggtatcag caaaaaccgg aaaagcgcc aagctgctc     600
atatataatg cgaaaacttt gccatcaggc gttccttccc ggttctcagg ctccggttct    660
ggaacggact ttactctcac tatcagtagc cttcagccag aggacttcgc cacttactat    720
tgccagcaat attggtctac tccttacacc tttgggggag ggaccaaatt ggaaatccgc    780
ctcgagaagc ccaccacgac gccagcgccg cgaccaccaa caccggcgcc caccatcgcg    840
tcgcagcccc tgtccctgcg cccagaggcg agccggccag cggcgggggg cgcagtgcac    900
acgaggggc tggacttcgc cagtgataag ccctttttggg tgctggtggt ggttggtgga    960
gtcctggctt gctatagctt gctagtaaca gtggccttta ttattttctg ggtgaaacgg    1020
ggcagaaaga aactcctgta tatattcaaa caaccattta tgagaccagt acaaactact   1080
caagaggaag atggctgtag ctgccgattt ccagaagaag aagaaggagg atgtgaactg   1140
agagtgaagt tcagcaggag cgcagacgcc cccgcgtacc agcagggcca gaaccagctc   1200
tataacgagc tcaatctagg acgaagagag gagtacgatg ttttggacaa gagacgtggc   1260
cgggaccctg agatggggg aaagccgcag agaaggaaga acctcagga aggcctctac    1320
aatgaactgc agaaagataa gatggcggag gcctacagtg agattgggat gaaaggcgag   1380
cgccggaggg gcaaggggca cgatggcctt taccagggtc tcagtacagc caccaaggac   1440
acctacgacg cccttcacat gcaggccctg ccccctcgct aa                     1482
```

<210> SEQ ID NO 23
<211> LENGTH: 493
<212> TYPE: PRT
<213> ORGANISM: Homo sapiens

<400> SEQUENCE: 23

```
Met Ala Leu Pro Val Thr Ala Leu Leu Leu Pro Leu Ala Leu Leu Leu
1               5                   10                  15

His Ala Ala Arg Pro Ala Ser Gln Val Gln Leu Val Glu Ser Gly Gly
                20                  25                  30

Gly Val Val Gln Pro Gly Arg Ser Leu Arg Leu Ser Cys Ala Ala Ser
            35                  40                  45

Gly Phe Thr Phe Ser Asp Tyr Trp Met Asn Trp Val Arg Gln Ala Pro
        50                  55                  60

Gly Lys Gly Leu Glu Trp Val Ala Gln Ile Arg Asp Lys Pro Tyr Asn
65                  70                  75                  80
```

```
Tyr Glu Thr Phe Tyr Ser Asp Ser Val Lys Gly Arg Phe Thr Ile Ser
                85                  90                  95

Arg Asp Asn Ser Lys Asn Thr Leu Tyr Leu Gln Met Asn Ser Leu Arg
            100                 105                 110

Ala Glu Asp Thr Ala Val Tyr Tyr Cys Thr Gly Ser Phe Ala Tyr Trp
        115                 120                 125

Gly Ala Gly Thr Thr Val Thr Val Ser Ser Gly Gly Gly Gly Ser Gly
    130                 135                 140

Gly Gly Gly Ser Gly Gly Gly Ser Asp Ile Gln Met Thr Gln Ser
145                 150                 155                 160

Pro Ser Ser Leu Ser Ala Ser Val Gly Asp Arg Val Thr Ile Thr Cys
                165                 170                 175

Arg Ala Ser Gly Asn Ile His Asn Tyr Leu Ala Trp Tyr Gln Gln Lys
            180                 185                 190

Pro Gly Lys Ala Pro Lys Leu Leu Ile Tyr Asn Ala Lys Thr Leu Pro
        195                 200                 205

Ser Gly Val Pro Ser Arg Phe Ser Gly Ser Gly Ser Gly Thr Asp Phe
    210                 215                 220

Thr Leu Thr Ile Ser Ser Leu Gln Pro Glu Asp Phe Ala Thr Tyr Tyr
225                 230                 235                 240

Cys Gln Gln Tyr Trp Ser Thr Pro Tyr Thr Phe Gly Gly Gly Thr Lys
                245                 250                 255

Leu Glu Ile Arg Leu Glu Lys Pro Thr Thr Thr Pro Ala Pro Arg Pro
            260                 265                 270

Pro Thr Pro Ala Pro Thr Ile Ala Ser Gln Pro Leu Ser Leu Arg Pro
        275                 280                 285

Glu Ala Ser Arg Pro Ala Ala Gly Gly Ala Val His Thr Arg Gly Leu
    290                 295                 300

Asp Phe Ala Ser Asp Lys Pro Phe Trp Val Leu Val Val Val Gly Gly
305                 310                 315                 320

Val Leu Ala Cys Tyr Ser Leu Leu Val Thr Val Ala Phe Ile Ile Phe
                325                 330                 335

Trp Val Lys Arg Gly Arg Lys Lys Leu Leu Tyr Ile Phe Lys Gln Pro
            340                 345                 350

Phe Met Arg Pro Val Gln Thr Thr Gln Glu Glu Asp Gly Cys Ser Cys
        355                 360                 365

Arg Phe Pro Glu Glu Glu Glu Gly Gly Cys Glu Leu Arg Val Lys Phe
    370                 375                 380

Ser Arg Ser Ala Asp Ala Pro Ala Tyr Gln Gln Gly Gln Asn Gln Leu
385                 390                 395                 400

Tyr Asn Glu Leu Asn Leu Gly Arg Arg Glu Glu Tyr Asp Val Leu Asp
                405                 410                 415

Lys Arg Arg Gly Arg Asp Pro Glu Met Gly Gly Lys Pro Gln Arg Arg
            420                 425                 430

Lys Asn Pro Gln Glu Gly Leu Tyr Asn Glu Leu Gln Lys Asp Lys Met
        435                 440                 445

Ala Glu Ala Tyr Ser Glu Ile Gly Met Lys Gly Glu Arg Arg Arg Gly
    450                 455                 460

Lys Gly His Asp Gly Leu Tyr Gln Gly Leu Ser Thr Ala Thr Lys Asp
465                 470                 475                 480

Thr Tyr Asp Ala Leu His Met Gln Ala Leu Pro Pro Arg
                485                 490
```

<210> SEQ ID NO 24
<211> LENGTH: 66
<212> TYPE: DNA
<213> ORGANISM: Homo sapiens

<400> SEQUENCE: 24
atgctgctgc tcgtgacaag cctgctgctg tgcgagctgc ccacccctgc ctttctgctg     60
atcccc                                                                66

<210> SEQ ID NO 25
<211> LENGTH: 22
<212> TYPE: PRT
<213> ORGANISM: Homo sapiens

<400> SEQUENCE: 25

Met Leu Leu Leu Val Thr Ser Leu Leu Leu Cys Glu Leu Pro His Pro
1               5                   10                  15

Ala Phe Leu Leu Ile Pro
            20

<210> SEQ ID NO 26
<211> LENGTH: 321
<212> TYPE: DNA
<213> ORGANISM: Mus musculus

<400> SEQUENCE: 26
gacatccaga tgacccagac caccagcagc ctgagcgcca gcctgggcga tagagtgacc     60
atcagctgca gagccagcca ggacatcagc aagtacctga actggtatca gcagaaaccc    120
gacggcaccg tgaagctgct gatctaccac accagcagac tgcacagcgg cgtgcccagc    180
agattttctg gcagcggctc cggcaccgac tacagcctga ccatctccaa cctggaacag    240
gaagatatcg ctacgtactt ttgtcagcag ggaaacacgc ttccatacac cttcggcggc    300
ggtacgaagt tggagatcac g                                              321

<210> SEQ ID NO 27
<211> LENGTH: 107
<212> TYPE: PRT
<213> ORGANISM: Mus musculus

<400> SEQUENCE: 27

Asp Ile Gln Met Thr Gln Thr Thr Ser Ser Leu Ser Ala Ser Leu Gly
1               5                   10                  15

Asp Arg Val Thr Ile Ser Cys Arg Ala Ser Gln Asp Ile Ser Lys Tyr
            20                  25                  30

Leu Asn Trp Tyr Gln Gln Lys Pro Asp Gly Thr Val Lys Leu Leu Ile
        35                  40                  45

Tyr His Thr Ser Arg Leu His Ser Gly Val Pro Ser Arg Phe Ser Gly
    50                  55                  60

Ser Gly Ser Gly Thr Asp Tyr Ser Leu Thr Ile Ser Asn Leu Glu Gln
65                  70                  75                  80

Glu Asp Ile Ala Thr Tyr Phe Cys Gln Gln Gly Asn Thr Leu Pro Tyr
                85                  90                  95

Thr Phe Gly Gly Gly Thr Lys Leu Glu Ile Thr
            100                 105

<210> SEQ ID NO 28
<211> LENGTH: 360
<212> TYPE: DNA

<213> ORGANISM: Mus musculus

<400> SEQUENCE: 28

```
gaggtcaaac tgcaggaatc cggaccaggg cttgtagccc cctcacaaag cctcagcgtg      60
acttgtacag tgagcggcgt tagtctgccg gactatggag tttcttggat tcggcaaccg     120
cccagaaaag ggctggaatg gcttggtgtt atatggggct cagaaactac ctattacaac     180
agtgctctca aaagccggct cacaataata aaggataata gcaaatctca agttttcctg     240
aaaatgaact ctctgcaaac agatgacacg gcgatctact actgcgcgaa acactactat     300
tacggcggca gctacgccat ggactattgg gggcagggga cgtcagtgac agtgtctagc     360
```

<210> SEQ ID NO 29
<211> LENGTH: 120
<212> TYPE: PRT
<213> ORGANISM: Mus musculus

<400> SEQUENCE: 29

Glu Val Lys Leu Gln Glu Ser Gly Pro Gly Leu Val Ala Pro Ser Gln
1               5                   10                  15

Ser Leu Ser Val Thr Cys Thr Val Ser Gly Val Ser Leu Pro Asp Tyr
            20                  25                  30

Gly Val Ser Trp Ile Arg Gln Pro Pro Arg Lys Gly Leu Glu Trp Leu
        35                  40                  45

Gly Val Ile Trp Gly Ser Glu Thr Thr Tyr Tyr Asn Ser Ala Leu Lys
    50                  55                  60

Ser Arg Leu Thr Ile Ile Lys Asp Asn Ser Lys Ser Gln Val Phe Leu
65                  70                  75                  80

Lys Met Asn Ser Leu Gln Thr Asp Asp Thr Ala Ile Tyr Tyr Cys Ala
                85                  90                  95

Lys His Tyr Tyr Tyr Gly Gly Ser Tyr Ala Met Asp Tyr Trp Gly Gln
            100                 105                 110

Gly Thr Ser Val Thr Val Ser Ser
        115                 120

<210> SEQ ID NO 30
<211> LENGTH: 135
<212> TYPE: DNA
<213> ORGANISM: Homo sapiens

<400> SEQUENCE: 30

```
accacgacgc ccgcccctag accccgacg cccgctccga ctatagcgag ccaacctctc       60
agcctgaggc ctgaagcatg tcgaccagca gcaggagggg cagtacacac caggggcctg     120
gattttgcct gtgat                                                      135
```

<210> SEQ ID NO 31
<211> LENGTH: 45
<212> TYPE: PRT
<213> ORGANISM: Homo sapiens

<400> SEQUENCE: 31

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly
            20                  25                  30

Gly Ala Val His Thr Arg Gly Leu Asp Phe Ala Cys Asp
        35                  40                  45

<210> SEQ ID NO 32
<211> LENGTH: 72
<212> TYPE: DNA
<213> ORGANISM: Homo sapiens

<400> SEQUENCE: 32

```
atctacatct gggcgccctt ggccgggact tgtggggtcc ttctcctgtc actggttatc      60
acccttact gc                                                           72
```

<210> SEQ ID NO 33
<211> LENGTH: 24
<212> TYPE: PRT
<213> ORGANISM: Homo sapiens

<400> SEQUENCE: 33

```
Ile Tyr Ile Trp Ala Pro Leu Ala Gly Thr Cys Gly Val Leu Leu Leu
 1               5                  10                  15

Ser Leu Val Ile Thr Leu Tyr Cys
            20
```

<210> SEQ ID NO 34
<211> LENGTH: 2166
<212> TYPE: DNA
<213> ORGANISM: Homo sapiens

<400> SEQUENCE: 34

```
atgctgctgc tcgtgacaag cctgctgctg tgcgagctgc ccaccctgc ctttctgctg        60
atccccgaca tccagatgac ccagaccacc agcagcctga cgccagcct gggcgataga       120
gtgaccatca gctgcagagc cagccaggac atcagcaagt acctgaactg gtatcagcag      180
aaacccgacg gcaccgtgaa gctgctgatc taccacacca gcagactgca cagcggcgtg      240
cccagcagat tttctggcag cggctccggc accgactaca gcctgaccat ctccaacctg      300
gaacaggaag atatcgctac gtactttgt cagcagggaa acacgcttcc atacaccttc       360
ggcggcggta cgaagttgga gatcacgggc ggaggaggga gtgaagtaca actcgtcgag      420
tccggcgggg gactggtaca gcccggacgg tccctgagac ttagttgtac ggcttctggt      480
ttcacgtttt ccgactattg gatgaattgg gtgaggcaag cgcccggtaa aggcctggaa      540
tgggtgggac aaattcgcga taagccgtat aattacgaaa cattctacag cgactctgtc      600
aagggtagat tcacaatctc ccgggatgac agtaaatcca ttgcatacct ccagatgaac      660
tctctcaaaa ccgaggatac agctgtatat tattgcactg ggagtttcgc ctactgggga     720
gctgggacga cggtaacggt atcctcaggt ggcggtggaa gcggtggtgg aggtagtgga     780
gggggtggga gtgccattag gatgactcag agcccagtt ctttcagtgc atcaacagga      840
gacagagtaa cgataacgtg ccgggcaagc ggtaacatcc ataattacct tgcgtggtac     900
caacagaaac tggtaaagc gccgaaactt ctcatttaca atgctaagac ccttccctcc      960
ggagttccct ctaggtttag tggctcaggt agcgggaccg actttacctt gacaatcagt    1020
tgcctgcaat cagaagactt tgcaacttac tactgccaac agtattggag cacccctat     1080
acgtttggcg gcggtactaa actggaaatc gcggtggtg gagggagcga ggtcaaactg     1140
caggaatccg gaccagggct tgtagccccc tcacaaagcc tcagcgtgac ttgtacagtg    1200
agcggcgtta gtctgccgga ctatggagtt tcttggattc ggcaaccgcc cagaaaggg     1260
ctggaatggc ttggtgttat atgggggtca gaaactacct attacaacag tgctctcaaa   1320
agccggctca caataataaa ggataatagc aaatctcaag ttttcctgaa aatgaactct   1380
```

```
ctgcaaacag atgacacggc gatctactac tgcgcgaaac actactatta cggcggcagc    1440
tacgccatgg actattgggg gcaggggacg tcagtgacag tgtctagcag cgggaccacg    1500
acgcccgccc ctagaccccc gacgcccgct ccgactatag cgagccaacc tctcagcctg    1560
aggcctgaag catgtcgacc agcagcagga ggggcagtac acaccagggg cctggatttt    1620
gcctgtgata tctacatctg ggcgcccttg gccgggactt gtggggtcct tctcctgtca    1680
ctggttatca ccctttactg caaacggggc agaaagaaac tcctgtatat attcaaacaa    1740
ccatttatga gaccagtaca aactactcaa gaggaagatg gctgtagctg ccgatttcca    1800
gaagaagaag aaggaggatg tgaactgaga gtgaagttca gcaggagcgc agacgccccc    1860
gcgtacaagc agggccagaa ccagctctat aacgagctca atctaggacg aagagaggag    1920
tacgatgttt tggacaagag acgtggccgg gaccctgaga tgggggggaaa gccgagaagg    1980 aagaaccctc aggaaggcct gtacaatgaa ctgcagaaag ataagatggc ggaggcctac    2040
agtgagattg ggatgaaagg cgagcgccgg aggggcaagg ggcacgatgg cctttaccag    2100
ggtctcagta cagccaccaa ggacacctac gacgcccttc acatgcaggc cctgcccct    2160 cgctaa                                                              2166
```

<210> SEQ ID NO 35
<211> LENGTH: 721
<212> TYPE: PRT
<213> ORGANISM: Homo sapiens

<400> SEQUENCE: 35

```
Met Leu Leu Leu Val Thr Ser Leu Leu Leu Cys Glu Leu Pro His Pro
1               5                   10                  15

Ala Phe Leu Leu Ile Pro Asp Ile Gln Met Thr Gln Thr Thr Ser Ser
            20                  25                  30

Leu Ser Ala Ser Leu Gly Asp Arg Val Thr Ile Ser Cys Arg Ala Ser
        35                  40                  45

Gln Asp Ile Ser Lys Tyr Leu Asn Trp Tyr Gln Gln Lys Pro Asp Gly
    50                  55                  60

Thr Val Lys Leu Leu Ile Tyr His Thr Ser Arg Leu His Ser Gly Val
65                  70                  75                  80

Pro Ser Arg Phe Ser Gly Ser Gly Ser Gly Thr Asp Tyr Ser Leu Thr
                85                  90                  95

Ile Ser Asn Leu Glu Gln Glu Asp Ile Ala Thr Tyr Phe Cys Gln Gln
            100                 105                 110

Gly Asn Thr Leu Pro Tyr Thr Phe Gly Gly Gly Thr Lys Leu Glu Ile
        115                 120                 125

Thr Gly Gly Gly Gly Ser Glu Val Gln Leu Val Glu Ser Gly Gly Gly
    130                 135                 140

Leu Val Gln Pro Gly Arg Ser Leu Arg Leu Ser Cys Thr Ala Ser Gly
145                 150                 155                 160

Phe Thr Phe Ser Asp Tyr Trp Met Asn Trp Val Arg Gln Ala Pro Gly
                165                 170                 175

Lys Gly Leu Glu Trp Val Gly Gln Ile Arg Asp Lys Pro Tyr Asn Tyr
            180                 185                 190

Glu Thr Phe Tyr Ser Asp Ser Val Lys Gly Arg Phe Thr Ile Ser Arg
        195                 200                 205

Asp Asp Ser Lys Ser Ile Ala Tyr Leu Gln Met Asn Ser Leu Lys Thr
    210                 215                 220
```

```
Glu Asp Thr Ala Val Tyr Tyr Cys Thr Gly Ser Phe Ala Tyr Trp Gly
225                 230                 235                 240

Ala Gly Thr Thr Val Thr Val Ser Ser Gly Gly Gly Ser Gly Gly
            245                 250                 255

Gly Gly Ser Gly Gly Gly Ser Ala Ile Arg Met Thr Gln Ser Pro
            260                 265                 270

Ser Ser Phe Ser Ala Ser Thr Gly Asp Arg Val Thr Ile Thr Cys Arg
        275                 280                 285

Ala Ser Gly Asn Ile His Asn Tyr Leu Ala Trp Tyr Gln Gln Lys Pro
290                 295                 300

Gly Lys Ala Pro Lys Leu Leu Ile Tyr Asn Ala Lys Thr Leu Pro Ser
305                 310                 315                 320

Gly Val Pro Ser Arg Phe Ser Gly Ser Gly Ser Gly Thr Asp Phe Thr
                325                 330                 335

Leu Thr Ile Ser Cys Leu Gln Ser Glu Asp Phe Ala Thr Tyr Tyr Cys
                340                 345                 350

Gln Gln Tyr Trp Ser Thr Pro Tyr Thr Phe Gly Gly Gly Thr Lys Leu
        355                 360                 365

Glu Ile Arg Gly Gly Gly Gly Ser Glu Val Lys Leu Gln Glu Ser Gly
370                 375                 380

Pro Gly Leu Val Ala Pro Ser Gln Ser Leu Ser Val Thr Cys Thr Val
385                 390                 395                 400

Ser Gly Val Ser Leu Pro Asp Tyr Gly Val Ser Trp Ile Arg Gln Pro
                405                 410                 415

Pro Arg Lys Gly Leu Glu Trp Leu Gly Val Ile Trp Gly Ser Glu Thr
                420                 425                 430

Thr Tyr Tyr Asn Ser Ala Leu Lys Ser Arg Leu Thr Ile Ile Lys Asp
        435                 440                 445

Asn Ser Lys Ser Gln Val Phe Leu Lys Met Asn Ser Leu Gln Thr Asp
450                 455                 460

Asp Thr Ala Ile Tyr Tyr Cys Ala Lys His Tyr Tyr Tyr Gly Gly Ser
465                 470                 475                 480

Tyr Ala Met Asp Tyr Trp Gly Gln Gly Thr Ser Val Thr Val Ser Ser
                485                 490                 495

Ser Gly Thr Thr Thr Pro Ala Pro Arg Pro Pro Thr Pro Ala Pro Thr
        500                 505                 510

Ile Ala Ser Gln Pro Leu Ser Leu Arg Pro Glu Ala Cys Arg Pro Ala
            515                 520                 525

Ala Gly Gly Ala Val His Thr Arg Gly Leu Asp Phe Ala Cys Asp Ile
            530                 535                 540

Tyr Ile Trp Ala Pro Leu Ala Gly Thr Cys Gly Val Leu Leu Leu Ser
545                 550                 555                 560

Leu Val Ile Thr Leu Tyr Cys Lys Arg Gly Arg Lys Lys Leu Leu Tyr
                565                 570                 575

Ile Phe Lys Gln Pro Phe Met Arg Pro Val Gln Thr Thr Gln Glu Glu
            580                 585                 590

Asp Gly Cys Ser Cys Arg Phe Pro Glu Glu Glu Glu Gly Gly Cys Glu
            595                 600                 605

Leu Arg Val Lys Phe Ser Arg Ser Ala Asp Ala Pro Ala Tyr Lys Gln
                610                 615                 620

Gly Gln Asn Gln Leu Tyr Asn Glu Leu Asn Leu Gly Arg Arg Glu Glu
625                 630                 635                 640

Tyr Asp Val Leu Asp Lys Arg Arg Gly Arg Asp Pro Glu Met Gly Gly
```

|  | 645 |  |  |  | 650 |  |  |  | 655 |  |  |
|---|---|---|---|---|---|---|---|---|---|---|---|
| Lys | Pro | Arg | Arg | Lys | Asn | Pro | Gln | Glu | Gly | Leu | Tyr | Asn | Glu | Leu | Gln |
|  |  |  | 660 |  |  |  |  | 665 |  |  |  |  | 670 |  |  |

Lys Asp Lys Met Ala Glu Ala Tyr Ser Glu Ile Gly Met Lys Gly Glu
              675                 680                 685

Arg Arg Arg Gly Lys Gly His Asp Gly Leu Tyr Gln Gly Leu Ser Thr
        690                 695                 700

Ala Thr Lys Asp Thr Tyr Asp Ala Leu His Met Gln Ala Leu Pro Pro
705                 710                 715                 720

Arg

<210> SEQ ID NO 36
<211> LENGTH: 2166
<212> TYPE: DNA
<213> ORGANISM: Homo sapiens

<400> SEQUENCE: 36

```
atgctgctgc tcgtgacaag cctgctgctg tgcgagctgc ccacccctgc ctttctgctg      60
atccccgaca tccagatgac ccagaccacc agcagcctga cgccagcct  gggcgataga     120
gtgaccatca gctgcagagc cagccaggac atcagcaagt acctgaactg gtatcagcag     180
aaacccgacg gcaccgtgaa gctgctgatc taccacacca gcagactgca cagcggcgtg     240
cccagcagat ttctggcag  cggctccggc accgactaca gcctgaccat ctccaacctg     300
gaacaggaag atatcgctac gtactttgt  cagcagggaa acacgcttcc atacaccttc     360
ggcggcggta cgaagttgga gatcacgggc ggaggaggga gtcaggtgca gcttgtcgag     420
agtggaggtg gcgtcgttca acctggtaga agtttgcggc tctcatgtgc ggcctctgga     480
tttactttt  ctgactactg gatgaactgg gtcaggcaag ctccaggtaa ggggcttgaa     540
tgggtggcgc agatccggga taagccatac aactacgaga cgttctactc agacagtgta     600
aagggcagat tactataag  tagagataat tcaaagaaca cgctctatct tcagatgaat     660
tcattgagag cggaggacac ggcggtgtac tactgtactg gcagctttgc gtactgggga     720
gctgggacaa cggtaacggt atcttctgga ggaggaggta gtggcgggg  tggctctgga     780
ggtggcggct ctgatataca aatgactcaa agtccatcta gtctcagcgc agcgtgggc     840
gacagggtca ctaaacgtg  tcgagcgtct ggcaatatac acaattactt ggcgtggtat     900
cagcaaaaac cgggaaaagc gccgaagctg ctcatatata tgcgaaaac  tttgccatca     960
ggcgttcctt cccggttctc aggctccggt tctggaacgg actttactct cactatcagt    1020
agccttcagc cagaggactt cgccacttac tattgccagc aatattggtc tactccttac    1080
acctttgggg agggaccaa  attggaaatc cgcggtggtg agggagcga  ggtcaaactg    1140
caggaatccg gaccagggct tgtagccccc tcacaaagcc tcagcgtgac ttgtacagtg    1200
agcggcgtta gtctgccgga ctatggagtt tcttggattc ggcaaccgcc agaaaaggg    1260
ctggaatggc ttggtgttat atggggctca gaaactacct attacaacag tgctctcaaa    1320
agccggctca caataataaa ggataatagc aaatctcaag ttttcctgaa aatgaactct    1380
ctgcaaacag atgacacggc gatctactac tgcgcgaaaac actactatta cggcggcagc    1440
tacgccatgg actattgggg gcaggggacg tcagtgacag tgtctagcag cgggaccacg    1500
acgcccgccc ctagaccccc gacgccgct  ccgactatag cgagccaacc tctcagcctg    1560
aggcctgaag catgtcgacc agcagcagga ggggcagtac acaccagggg cctggatttt    1620
gcctgtgata tctacatctg gcgcccttg  gccgggactt gtggggtcct tctcctgtca    1680
```

```
ctggttatca ccctttactg caaacggggc agaaagaaac tcctgtatat attcaaacaa    1740
ccatttatga gaccagtaca aactactcaa gaggaagatg ctgtagctgc cgatttcca    1800 gaagaagaag aaggaggatg tgaactgaga gtgaagttca gcaggagcgc agacgccccc    1860
gcgtacaagc agggccagaa ccagctctat aacgagctca atctaggacg aagagaggag    1920
tacgatgttt tggacaagag acgtggccgg gaccctgaga tgggggggaaa gccgagaagg    1980 aagaaccctc aggaaggcct gtacaatgaa ctgcagaaaa ataagatggc ggaggcctac    2040
agtgagattg ggatgaaagg cgagcgccgg aggggcaagg ggcacgatgg cctttaccag    2100
ggtctcagta cagccaccaa ggacacctac gacgcccttc acatgcaggc cctgccccct    2160
cgctaa                                                               2166

<210> SEQ ID NO 37
<211> LENGTH: 721
<212> TYPE: PRT
<213> ORGANISM: Homo sapiens

<400> SEQUENCE: 37

Met Leu Leu Leu Val Thr Ser Leu Leu Leu Cys Glu Leu Pro His Pro
1               5                   10                  15

Ala Phe Leu Leu Ile Pro Asp Ile Gln Met Thr Gln Thr Thr Ser Ser
            20                  25                  30

Leu Ser Ala Ser Leu Gly Asp Arg Val Thr Ile Ser Cys Arg Ala Ser
        35                  40                  45

Gln Asp Ile Ser Lys Tyr Leu Asn Trp Tyr Gln Gln Lys Pro Asp Gly
    50                  55                  60

Thr Val Lys Leu Leu Ile Tyr His Thr Ser Arg Leu His Ser Gly Val
65                  70                  75                  80

Pro Ser Arg Phe Ser Gly Ser Gly Ser Gly Thr Asp Tyr Ser Leu Thr
                85                  90                  95

Ile Ser Asn Leu Glu Gln Glu Asp Ile Ala Thr Tyr Phe Cys Gln Gln
            100                 105                 110

Gly Asn Thr Leu Pro Tyr Thr Phe Gly Gly Gly Thr Lys Leu Glu Ile
        115                 120                 125

Thr Gly Gly Gly Gly Ser Gln Val Gln Leu Val Glu Ser Gly Gly Gly
    130                 135                 140

Val Val Gln Pro Gly Arg Ser Leu Arg Leu Ser Cys Ala Ala Ser Gly
145                 150                 155                 160

Phe Thr Phe Ser Asp Tyr Trp Met Asn Trp Val Arg Gln Ala Pro Gly
                165                 170                 175

Lys Gly Leu Glu Trp Val Ala Gln Ile Arg Asp Lys Pro Tyr Asn Tyr
            180                 185                 190

Glu Thr Phe Tyr Ser Asp Ser Val Lys Gly Arg Phe Thr Ile Ser Arg
        195                 200                 205

Asp Asn Ser Lys Asn Thr Leu Tyr Leu Gln Met Asn Ser Leu Arg Ala
    210                 215                 220

Glu Asp Thr Ala Val Tyr Tyr Cys Thr Gly Ser Phe Ala Tyr Trp Gly
225                 230                 235                 240

Ala Gly Thr Thr Val Thr Val Ser Ser Gly Gly Gly Ser Gly Gly Gly
                245                 250                 255

Gly Gly Ser Gly Gly Gly Gly Ser Asp Ile Gln Met Thr Gln Ser Pro
            260                 265                 270

Ser Ser Leu Ser Ala Ser Val Gly Asp Arg Val Thr Ile Thr Cys Arg
```

-continued

```
                275                 280                 285
Ala Ser Gly Asn Ile His Asn Tyr Leu Ala Trp Tyr Gln Gln Lys Pro
290                 295                 300
Gly Lys Ala Pro Lys Leu Leu Ile Tyr Asn Ala Lys Thr Leu Pro Ser
305                 310                 315                 320
Gly Val Pro Ser Arg Phe Ser Gly Ser Gly Ser Gly Thr Asp Phe Thr
                325                 330                 335
Leu Thr Ile Ser Ser Leu Gln Pro Glu Asp Phe Ala Thr Tyr Tyr Cys
                340                 345                 350
Gln Gln Tyr Trp Ser Thr Pro Tyr Thr Phe Gly Gly Gly Thr Lys Leu
                355                 360                 365
Glu Ile Arg Gly Gly Gly Ser Glu Val Lys Leu Gln Glu Ser Gly
370                 375                 380
Pro Gly Leu Val Ala Pro Ser Gln Ser Leu Ser Val Thr Cys Thr Val
385                 390                 395                 400
Ser Gly Val Ser Leu Pro Asp Tyr Gly Val Ser Trp Ile Arg Gln Pro
                405                 410                 415
Pro Arg Lys Gly Leu Glu Trp Leu Gly Val Ile Trp Gly Ser Glu Thr
                420                 425                 430
Thr Tyr Tyr Asn Ser Ala Leu Lys Ser Arg Leu Thr Ile Ile Lys Asp
                435                 440                 445
Asn Ser Lys Ser Gln Val Phe Leu Lys Met Asn Ser Leu Gln Thr Asp
450                 455                 460
Asp Thr Ala Ile Tyr Tyr Cys Ala Lys His Tyr Tyr Tyr Gly Gly Ser
465                 470                 475                 480
Tyr Ala Met Asp Tyr Trp Gly Gln Gly Thr Ser Val Thr Val Ser Ser
                485                 490                 495
Ser Gly Thr Thr Thr Pro Ala Pro Arg Pro Pro Thr Pro Ala Pro Thr
                500                 505                 510
Ile Ala Ser Gln Pro Leu Ser Leu Arg Pro Glu Ala Cys Arg Pro Ala
                515                 520                 525
Ala Gly Gly Ala Val His Thr Arg Gly Leu Asp Phe Ala Cys Asp Ile
530                 535                 540
Tyr Ile Trp Ala Pro Leu Ala Gly Thr Cys Gly Val Leu Leu Leu Ser
545                 550                 555                 560
Leu Val Ile Thr Leu Tyr Cys Lys Arg Gly Arg Lys Lys Leu Leu Tyr
                565                 570                 575
Ile Phe Lys Gln Pro Phe Met Arg Pro Val Gln Thr Thr Gln Glu Glu
                580                 585                 590
Asp Gly Cys Ser Cys Arg Phe Pro Glu Glu Glu Glu Gly Gly Cys Glu
                595                 600                 605
Leu Arg Val Lys Phe Ser Arg Ser Ala Asp Ala Pro Ala Tyr Lys Gln
                610                 615                 620
Gly Gln Asn Gln Leu Tyr Asn Glu Leu Asn Leu Gly Arg Arg Glu Glu
625                 630                 635                 640
Tyr Asp Val Leu Asp Lys Arg Arg Gly Arg Asp Pro Glu Met Gly Gly
                645                 650                 655
Lys Pro Arg Arg Lys Asn Pro Gln Glu Gly Leu Tyr Asn Glu Leu Gln
                660                 665                 670
Lys Asp Lys Met Ala Glu Ala Tyr Ser Glu Ile Gly Met Lys Gly Glu
                675                 680                 685
Arg Arg Arg Gly Lys Gly His Asp Gly Leu Tyr Gln Gly Leu Ser Thr
690                 695                 700
```

-continued

```
Ala Thr Lys Asp Thr Tyr Asp Ala Leu His Met Gln Ala Leu Pro Pro
705             710                 715                 720
Arg
```